(12) United States Patent
Komiya et al.

(10) Patent No.: US 7,756,328 B2
(45) Date of Patent: Jul. 13, 2010

(54) COLOR CHART PROCESSING APPARATUS, COLOR CHART PROCESSING METHOD, AND COLOR CHART PROCESSING PROGRAM

(75) Inventors: Yasuhiro Komiya, Hino (JP); Takeyuki Ajito, Hachioji (JP); Toru Wada, Niiza (JP)

(73) Assignee: Olympus Corporation, Tokyo (JP)

( * ) Notice: Subject to any disclaimer, the term of this patent is extended or adjusted under 35 U.S.C. 154(b) by 978 days.

(21) Appl. No.: 11/484,248

(22) Filed: Jul. 11, 2006

(65) Prior Publication Data

US 2006/0250668 A1 Nov. 9, 2006

Related U.S. Application Data

(63) Continuation of application No. PCT/JP2005/000212, filed on Jan. 12, 2005.

(30) Foreign Application Priority Data

Jan. 13, 2004 (JP) ............... 2004-006123

(51) Int. Cl.
*G06K 9/00* (2006.01)
*G06K 9/34* (2006.01)
*G06K 1/00* (2006.01)
*G06F 15/00* (2006.01)
*H04N 1/60* (2006.01)

(52) U.S. Cl. .................. 382/164; 358/1.9; 358/518
(58) Field of Classification Search ................. 382/164; 358/1.9, 518
See application file for complete search history.

(56) References Cited

U.S. PATENT DOCUMENTS 5,218,671 A * 6/1993 Liao et al. ............ 345/595
5,929,998 A * 7/1999 Kettler et al. ............ 356/405
6,069,696 A * 5/2000 McQueen et al. ............ 356/326

(Continued)

FOREIGN PATENT DOCUMENTS

AT 404 886 B 7/1998

(Continued)

OTHER PUBLICATIONS

German Office Action (and English translation thereof) dated Mar. 18, 2008, issued in a counterpart German Application.

(Continued)

*Primary Examiner*—Samir A Ahmed
*Assistant Examiner*—Li Liu
(74) *Attorney, Agent, or Firm*—Frishauf, Holtz, Goodman & Chick, P.C.

(57) ABSTRACT

A color chart processing apparatus includes a spectrum calculating unit for receiving information regarding a spectral reflection factor of each color contained in a predetermined color chart and information regarding determination illumination light, and determining a spectrum of the color contained in the predetermined color chart under the determination illumination light by calculating the received information, and a determination information output unit for receiving a color signal of a subject, determining which color of the predetermined color chart closest matches the color signal of the subject by comparing the spectrum of each color determined by the spectrum calculating unit with the color signal of the subject, and outputting information identifying the resulting determination color.

66 Claims, 20 Drawing Sheets

U.S. PATENT DOCUMENTS

| | | |
|---|---|---|
| 6,342,952 B1 | 1/2002 | Chan |
| 6,766,050 B1 * | 7/2004 | Saikawa et al. ............. 382/162 |
| 6,856,354 B1 * | 2/2005 | Ohsawa ....................... 348/370 |
| 6,980,231 B1 * | 12/2005 | Ohsawa ....................... 348/188 |
| 7,009,640 B1 * | 3/2006 | Ishii et al. ................. 348/223.1 |
| RE39,712 E * | 7/2007 | Vogel ........................ 348/222.1 |
| 2003/0156194 A1 * | 8/2003 | Sugiura et al. .............. 348/187 |

FOREIGN PATENT DOCUMENTS

| | | |
|---|---|---|
| DE | 196 36 774 C2 | 3/1998 |
| DE | 197 80 609 T1 | 7/1998 |
| DE | 198 50 350 C1 | 9/2000 |
| JP | 7-120324 A | 5/1995 |
| JP | 08-075552 A | 3/1996 |
| JP | 11-96333 A | 4/1999 |
| JP | 2000-253264 A | 9/2000 |
| JP | 2000-331076 A | 11/2000 |
| JP | 2000-338950 A | 12/2000 |
| JP | 2001-311666 A | 11/2001 |
| JP | 2002-286549 A | 10/2002 |
| JP | 2003-532945 A | 11/2003 |
| WO | WO 01/28231 A1 | 4/2001 |

OTHER PUBLICATIONS

Office Action dated Oct. 7, 2008, issued in a Japanese Divisional Application (JP Application No. 2006-198426) of the Japanese application corresponding to Japanese application JP 2004-006123.

* cited by examiner

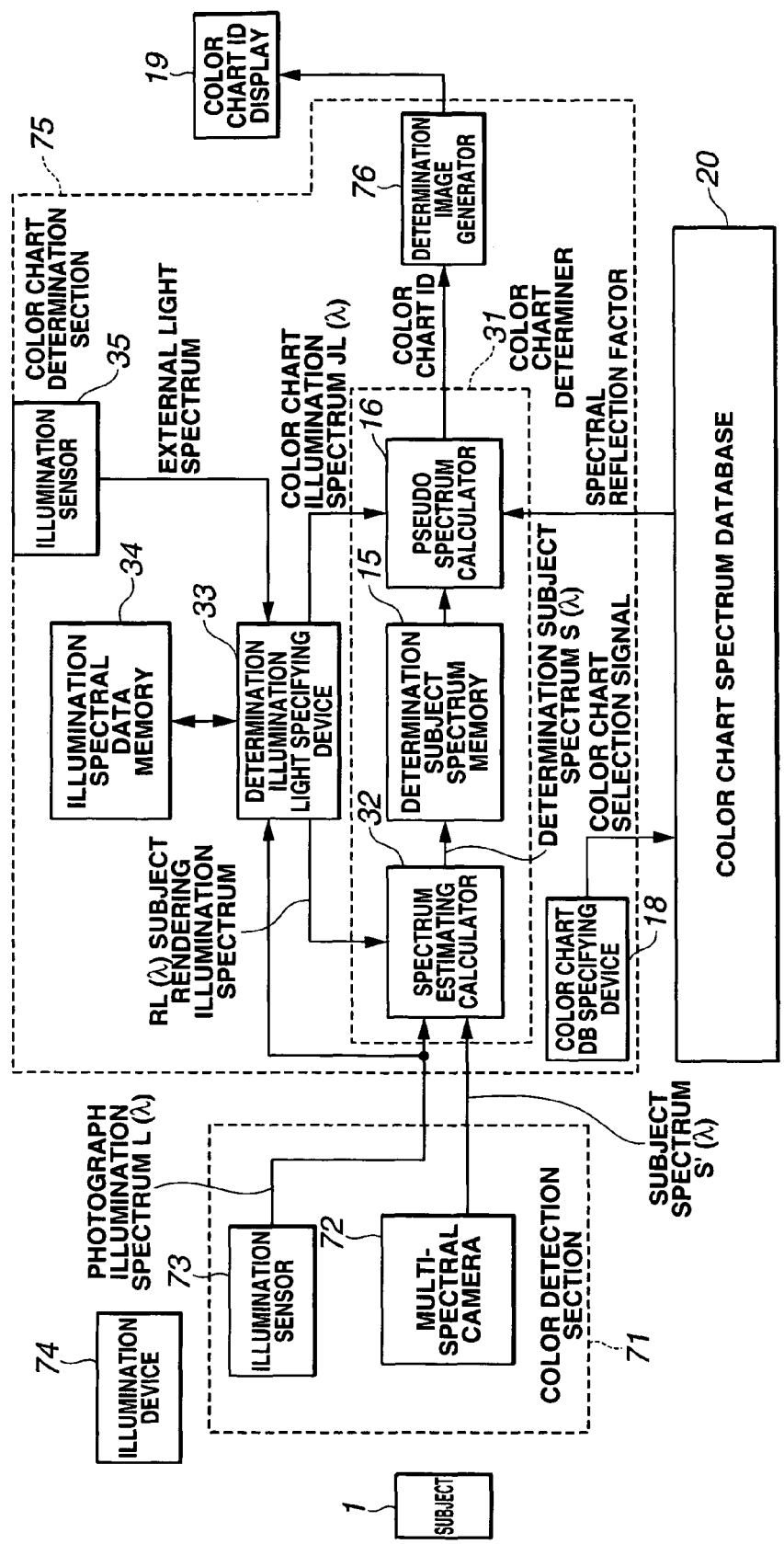

80  82  81

83  82

COLOR CHART PROCESSING APPARATUS, COLOR CHART PROCESSING METHOD, AND COLOR CHART PROCESSING PROGRAM

CROSS REFERENCE TO RELATED APPLICATION

This application is a continuation application of PCT/JP2005/000212 filed on Jan. 12, 2005 and claims benefit of Japanese Application No. 2004-006123 filed in Japan on Jan. 13, 2004, the entire contents of which are incorporated herein by this reference.

BACKGROUND OF THE INVENTION

1. Field of the Invention

The present invention relates to a color chart processing apparatus, a color chart processing method, and a color chart processing program for acquiring spectral image information of a subject, and determining correspondence between a color of the acquired image and a predetermined color chart.

2. Description of the Related Art

Color management has been conventionally performed in numerous fields. Colors of objects are typically determined based on sensory evaluation using a color chart. For example, in the dentistry field, a color chart called a shade guide is used to determine which grade an artificial denture is classified to when the artificial denture is produced. For example, a leaf color chart is used to determine an agricultural crop such as rice plant. By checking a crop against the leaf color chart, a current growing condition is known. Growth and development management is thus performed to adjust the amount of fertilizer. The application of color charts is not limited to the dentistry and agricultural fields. The color charts are used for diagnosis and examination in a variety of other fields, such as coating painting of cars, painting of buildings, foods, and clothes.

Each color is identified using a number in the color chart (color chart number). Experienced users and specialists visibly check an object to be examined against a color chart, thereby determining the color chart number. There occur variations inherent to a user himself, variations from user to user, and variations in illumination conditions under which a subject is placed. It is thus difficult to accurately identify the color chart number.

Japanese Unexamined Patent Application Publication No. 7-120324 (hereinafter referred to Document 1) discloses a technique of color classification using a camera system. In the disclosed technique, a multi-spectral camera is used to classify grade using a multi-spectral image captured by the camera. In comparison with an ordinary RGB camera, the multi-spectral camera substantially increases a color chart determination accuracy level.

SUMMARY OF THE INVENTION

A color chart processing apparatus of the present invention includes spectrum calculating means for receiving information regarding a spectral reflection factor of each color contained in a predetermined color chart and information regarding determination illumination light, and determining a spectrum of the color contained in the predetermined color chart under the determination illumination light by calculating the received information, and determination information output means for receiving a color signal of a subject, determining which color of the predetermined color chart closest matches the color signal of the subject by comparing the spectrum of each color determined by the spectrum calculating means with the color signal of the subject, and outputting information identifying the resulting determination color.

A color chart processing method of the present invention includes a spectrum calculating step of receiving information regarding a spectral reflection factor of each color contained in a predetermined color chart and information regarding determination illumination light, and determining a spectrum of the color contained in the predetermined color chart under the determination illumination light by calculating the received information, a determination step of determining which color of the predetermined color chart closest matches an input color signal of a subject by comparing the spectrum of each color determined in the spectrum calculating step with the color signal of the subject, and a step of outputting information identifying the resulting determination color in the determination step.

A color chart processing program of the present invention causes a computer to perform a spectrum calculating processing of receiving information regarding a spectral reflection factor of each color contained in a predetermined color chart and information regarding determination illumination light, and determining a spectrum of the color contained in the predetermined color chart under the determination illumination light by calculating the received information, a determination processing of determining which color of the predetermined color chart closest matches an input color signal of a subject by comparing the spectrum of each color determined in the spectrum calculating processing with the color signal of the subject, and a processing of outputting information identifying the resulting determination color in the determination processing.

A color chart processing program of the present invention causes a computer to perform a spectrum estimation calculating processing of determining a spectral reflection factor of a subject from a color signal of the subject and photographing illumination information obtained when the color signal of the subject is acquired, and reproducing the color signal of the subject using the determined spectral reflection factor and newly set subject rendering illumination information, a spectrum calculating step of receiving information regarding a spectral reflection factor of each color contained in a predetermined color chart and information regarding determination illumination light, and determining a spectrum of the color contained in the predetermined color chart under the determination illumination light by calculating the received information, a determination processing of determining which color of the predetermined color chart closest matches the reproduced color signal of the subject by comparing the color signal of the subject reproduced in the spectrum estimation calculating processing with the spectrum of each color determined in the spectrum calculating processing, and a processing of outputting information identifying the resulting determination color in the determination processing.

A color chart processing apparatus of the present invention includes mixing ratio database means for storing, by each color, information regarding a color contained in a predetermined color chart, information regarding a plurality of colors that are mixed to produce the color, and information regarding a mixing ratio, and mixing amount information output means for outputting information regarding a mixing amount by receiving information identifying the color contained in the predetermined color chart, and by reading information stored on the mixing ratio database means.

BRIEF DESCRIPTION OF THE DRAWINGS

FIG. 8 is a block diagram illustrating a color chart processing apparatus in accordance with a fourth embodiment of the present invention.

DETAILED DESCRIPTION OF THE PREFERRED EMBODIMENT(S)

Figure 1:
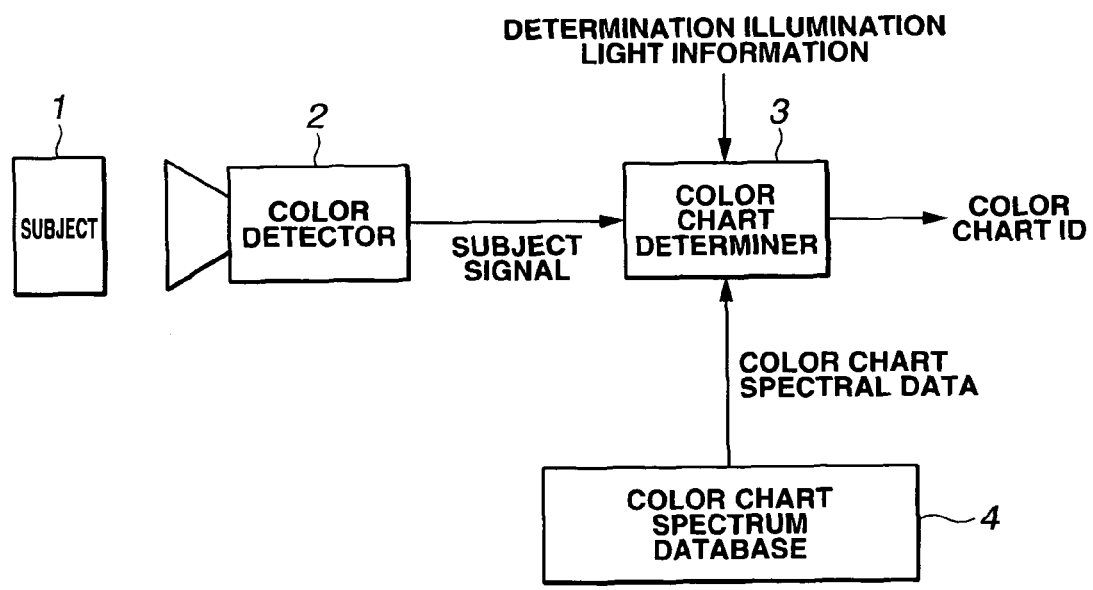
FIG. 1 is a block diagram illustrating a color chart processing apparatus in accordance with a first embodiment of the present invention.

The embodiments of the present invention are described below with reference to the drawings. FIG. 1 is a block diagram illustrating a color chart processing apparatus in accordance with a first embodiment of the present invention.

The color chart processing apparatus of FIG. 1 determines which color of a predetermined color chart the color of a subject 1 corresponds to, and outputs a color chart ID such as a color chart number or a color chart symbol uniquely identifying a color of the color chart. A color detector 2 is arranged to face the subject 1. The color detector 2 is composed of a multi-spectral camera, for example, and photographs the subject 1, thereby acquiring a subject signal. The subject signal contains spectral information of the subject 1. The subject signal may occasionally contain spectral information of illumination light at the photographing.

Meanwhile, a color chart spectrum database 4 stores spectrum information of each color contained in at least one color chart. In response to a color chart specified, the color chart spectrum database 4 outputs information of a spectrum of each color (hereinafter referred to as color chart spectral data).

A color chart determiner 3 receives the subject signal from the color detector 2 and the color chart spectral data from the color chart spectrum database 4. The color chart determiner 3 also receives determination illumination light information as information of illumination light for use in color chart determination.

The color chart determiner 3 calculates spectrum information of each color in the specified color chart based on the determination illumination light information and the color chart spectral data. The color chart determiner 3 determines which color of the color chart the color of the subject 1 corresponds to by comparing the calculated spectral information of each color in the color chart with spectral information contained in the subject signal, and then outputs a color chart ID of the corresponding color.

In the embodiment thus constructed, the color detector 2 photographs the subject 1 illuminated by predetermined illumination light. The subject signal from the color detector 2 is supplied to the color chart determiner 3. The color chart determiner 3 successively reads the color chart spectral data of each color in the predetermined color chart from the color chart spectrum database 4, and obtains the spectral information of each color in the color chart under the predetermined illumination light based on the read color chart spectral data and the determination illumination light information. The color chart determiner 3 compares the calculated spectral information of each color with the spectral information in the subject signal, thereby determining which color of the color chart the color of the subject 1 corresponds to. The color chart determiner 3 then outputs the color chart ID of the determined color as the color of the subject 1.

In accordance with the present embodiment, the spectral information of each color is calculated using the determination illumination light information. As in the visual color chart determination, the determination result of the color chart ID varies in response to the determination (observation) illumination light. For example, in the dentistry field, a photographing site of an object to be determined may be different from a determination site of a color chart. If the photographing site is remote from the determination site, information regarding photographing light may be unknown. Even if the photographing light is known, a user of a color chart may determine the color chart using preferred determination light based on experience without paying attention to the photographing light. The embodiment of the present invention is useful in such an occasion. The color chart determination is performed using information of the determination illumination light information, and useful and effective color chart ID is calculated.

In the present embodiment, the photographing illumination light information at the photographing of the object to be determined may be used. The color chart ID is thus calculated in a state in which the determination illumination light is equalized with the photographing illumination light.

In the present embodiment, the color chart spectrum database storing the spectral information of each color chart is arranged. The spectral information of each color in the color chart is calculated based on the spectral information from the color chart spectrum database and the information of the determination illumination light. The color chart ID indicating the color of the subject is obtained by comparing the calculated spectral information with the spectral information of the subject. Rather than using the degree of color unique to a color chart determination system, the color of the object is determined by applying a color in a color chart defined in each of a variety of fields. Since the color chart spectrum database storing the spectral information of the colors of a variety of color charts is used, it is not necessary to learn correspondence between a color unique to the system and the color in the color chart. Since the color chart ID is determined under any illumination light source, the color chart processing apparatus is extremely useful. For example, the color chart ID may be always determined under constant illumination conditions or may be determined under various illumination conditions.

Figure 2:
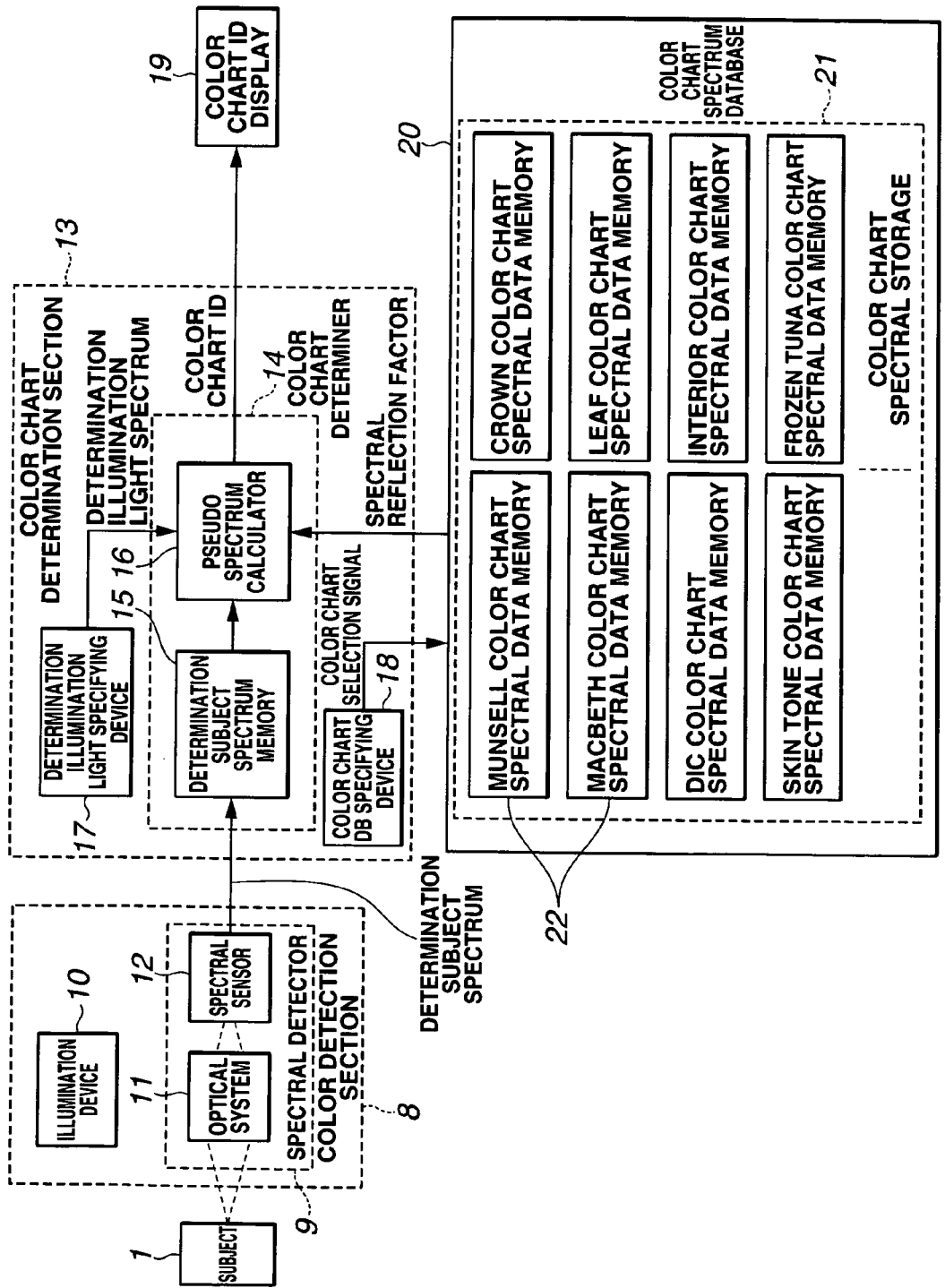
FIG. 2 is a block diagram illustrating a color chart processing apparatus in accordance with a second embodiment of the present invention.

FIG. 2 is a block diagram of a color chart processing apparatus in accordance with a second embodiment of the present invention. A specific structure of the color chart processing apparatus shown herein calculates the color chart ID using only the information of the determination illumination light without using the information of the photographing illumination light.

The color chart processing apparatus of the present embodiment includes a color detection section 8, a color chart spectrum database 20, a color chart determination section 13, and a color chart ID display 19.

The color detection section 8 is a contact-type or non-contact-type spectrometer, and includes a spectral detector 9 and an illumination device 10. The illumination device 10 directs photographing illumination light onto a subject. The illumination device 10 may be one of a variety of light sources including an xenon lamp, a fluorescent lamp, and a halogen lamp. The spectral detector 9 includes an optical system 11 and a spectral sensor 12. The optical system 11 introduces the light reflected by the subject 1 to the spectral sensor 12. The spectral sensor 12 spectroscopes incident light and obtains a spectral distribution of a light ray reflected from the subject. The spectral sensor 12 outputs the obtained spectral distribution as a determination subject spectrum to the color chart determination section 13.

The color chart spectrum database 20 includes a color chart spectrum storage 21. The color chart spectrum storage 21 includes a plurality of spectral data memories 22 storing spectral data of a plurality of color charts. As shown in FIG. 2, the color chart spectrum storage 21 includes the spectral data memories 22 storing the spectral data of a Munsell color chart, a crown color chart, a Macbeth color chart, a leaf color chart, a DIC color chart, an interior color chart, a skin tone color chart, and a frozen tuna color chart.

In the present embodiment, the spectral data to be stored on the spectral data memories 22 includes a spectral reflection factor of each color in each color chart. The following table 1 lists the spectral data stored on the spectral data memories 22 of FIG. 2. The table 1 shows that the spectral data includes information of the spectral reflection factor of each of color chart ID.

TABLE 1

| Color chart ID | Spectrum | | | | | | | (Wavelength) |
|---|---|---|---|---|---|---|---|---|
| | 390 | 400 | 410 | 420 | ... | 770 | 780 | |
| 10GY 2/2 | 0.42 | 0.45 | 0.65 | 0.76 | ... | 0.32 | 0.25 | |
| 10GY 2/4 | 0.55 | 0.47 | 0.43 | 0.88 | ... | 0.44 | 0.36 | |
| 10GY 2/6 | 0.73 | 0.49 | 0.27 | 0.98 | ... | 0.56 | 0.45 | |
| . | | | | | | | | |
| . | | | | | | | | |
| . | | | | | | | | |
| n | | | | $CN(n, \lambda)$ | | | | |

In the table 1, n represents the color chart ID and $CN(n, \lambda)$ represents color chart spectrum of the color chart IDn.

The color chart spectrum database 20 receives a color chart selection signal for selecting a color chart. The color chart spectrum database 20 selects information of a spectral reflection factor stored on the spectral data memories 22 in response to the color chart selection signal and outputs the selected spectral reflection factor information to a color chart determiner 14 in the color chart determination section 13.

The color chart determination section 13 includes the color chart determiner 14, a color chart DB specifying device 18 and a determination illumination light specifying device 17. The color chart DB specifying device 18 specifies the type of the color chart for use in the color chart determination. The color chart DB specifying device 18 generates a color chart selection signal responsive to the type of the color chart and outputs the generated color chart selection signal to the color chart spectrum database 20. The color chart DB specifying device 18 not only generates the color chart selection signal representing the type of the predetermined color chart but also generates a color chart selection signal responsive to a designation of a user.

The determination illumination light specifying device 17 outputs to the color chart determiner 14, for example, a determination illumination light spectrum as information identifying illumination light for use in the color chart determination. The determination illumination light specifying device 17 may be designed to output a predetermined determination illumination light spectrum or may be designed to output a determination illumination light spectrum responsive to a designation of the user. For example, the determination illumination light specifying device 17, including a memory storing the spectral information of at least one light source such as D65 standard light source, outputs the spectral information of the predetermined light source in response to an instruction from the user.

The color chart determiner 14 includes a determination subject spectrum memory 15 and a pseudo spectrum calculator 16 forming spectrum calculation means. The determination subject spectrum memory 15 stores a subject spectrum from the color detection section 8. The pseudo spectrum calculator 16 successively receives the spectral reflection factors of the color chart IDs from the color chart spectrum database 20 and obtains a spectrum (hereinafter referred to as a color chart spectrum) from a product of the spectral reflection factor of each color chart ID and the determination illumination light spectrum.

The pseudo spectrum calculator 16 reads the determination subject spectrum stored on the determination subject spectrum memory 15, and determines a color chart spectrum closest matching the subject spectrum from among the color chart spectra of the determined color chart IDs. For example, the pseudo spectrum calculator 16 determines the color chart spectrum in accordance with the following equation (1).

$$\phi(n)=|S(\lambda)-CN(n,\lambda)\times JL(\lambda)|^2 \qquad (1)$$

where λ represents wavelength, n represents the color chart ID, S(λ) represents the subject spectrum, CN(n,λ) represents the color chart spectrum of the color chart IDn, and JL(λ) represents the determination illumination light spectra.

The pseudo spectrum calculator 16 determines the color chart spectrum minimizing φ(n) in equation (1), and outputs the color chart ID identifying the color chart spectrum.

The color chart ID is supplied from the color chart determiner 14 to a color chart ID display 19. The color chart ID display 19 displays the input color chart ID on an unshown screen. The pseudo spectrum calculator 16 and the color chart ID display 19 form determination information output means.

Operation of the present embodiment thus constructed is described below.

A photographing area of the color detection section 8 is set to a predetermined location within the subject 1 that is undergoing the color chart ID determination. The illumination device 10 directs illumination light to the subject 1 and the color detection section 8 acquires the spectrum of the photographing area. The spectrum of the subject 1 is thus measured under the illumination light of the illumination device 10. The measured determination subject spectrum is supplied to the determination subject spectrum memory 15 in the color chart determiner 14.

In the color chart determination section 13, the color chart DB specifying device 18 specifies the type of color chart to be determined. The color chart selection signal from the color chart DB specifying device 18 is supplied to the color chart spectrum database 20. On a per color chart ID basis, the color chart spectrum database 20 reads the spectral data (spectral reflection factor) stored on the spectral data memories 22 and selected in response to the color chart selection signal and outputs the spectral data to the color chart determiner 14.

Under the determination illumination light, the color chart determiner 14 determines the color chart spectrum based on the product of the spectral reflection factor and the determination illumination light spectrum, and then determines a color chart spectrum closest matching the subject spectrum by comparing the subject spectrum with the determined color chart spectrum. The color chart determiner 14 outputs the color chart ID of the determined color chart spectrum as a color chart ID of a color closest matching the color of the subject 1.

The color chart ID is thus provided to the color chart ID display 19. The color chart ID display 19 displays the input color chart ID on the unshown display screen.

The apparatus thus determines which color of the specified color chart closest matches the color of the subject under desired determination illumination light. The user then can verify on the display screen the determination results.

In accordance with the present embodiment, the user can obtain quickly and easily the color chart ID of the color closest matching the color of the subject. In this case, the color chart ID is easily obtained without the need for learning the correspondence between the color classification unique to the system and the color classification of the color chart. In a manner free from the photographing illumination light, the color chart ID is obtained under a desired determination illumination light source.

A color chart ID specifying device can easily update the type of the color chart for use in determination, thereby allowing the color chart determination to be used in a variety of applications.

The color chart ID display 19 not only displays the color chart ID but also displays the type of the color chart used in the color chart determination. The color chart determination may be performed using a plurality of types of the color charts on the same subject so that the determination results of the color chart IDs may be provided on a per color chart basis.

Figure 3:
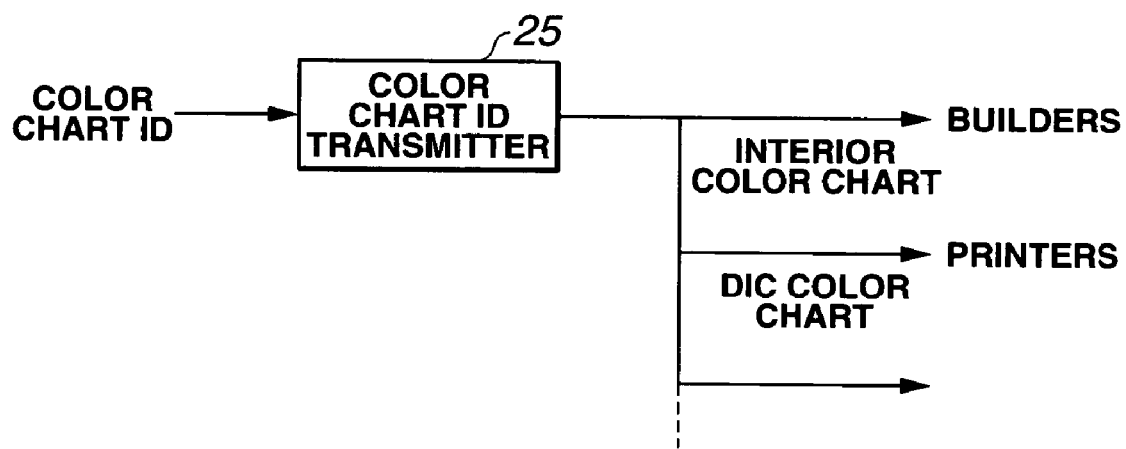
FIG. 3 is a block diagram illustrating an attachment attached to the second embodiment.

The information of the obtained color chart ID may be instantaneously transmitted to apparatuses at remote places or owned by a large number of members via an unshown network. FIG. 3 is a block diagram of such a system.

The color chart ID is supplied from the color chart determiner 14 in the color chart determination section 13 to a color chart ID transmitter 25. In response to the type of the input color chart, or in response to an operation of a user, the color chart ID transmitter 25 transmits the color chart ID to apparatuses of different operators on a per color chart ID basis.

A plurality of color chart IDs determined by the color chart determiner 14 can thus be used for a plurality of different applications. For example, the color chart DB specifying device 18 specifies an interior color chart and a DIC color chart for a color a building designer may wish to use, and the color chart determination is then performed. In this case, the color chart IDs are obtained from the interior color chart and the DIC color chart from the color chart determiner 14. As shown in FIG. 3, the color chart ID transmitter 25 transmits the color chart ID of the interior color chart to a builder. The builder can then faithfully reproduce a color in accordance with the color specified by the building designer using the interior color chart. The color chart ID transmitter 25 transmits the color chart ID of the DIC color chart to a printer. For example, the printer prints catalogs in which the color specified by the building designer is faithfully reproduced using the DIC color chart. Since a plurality of color chart IDs are concurrently output in accordance with the present embodiment, the results are used in a plurality of applications.

Figure 4:
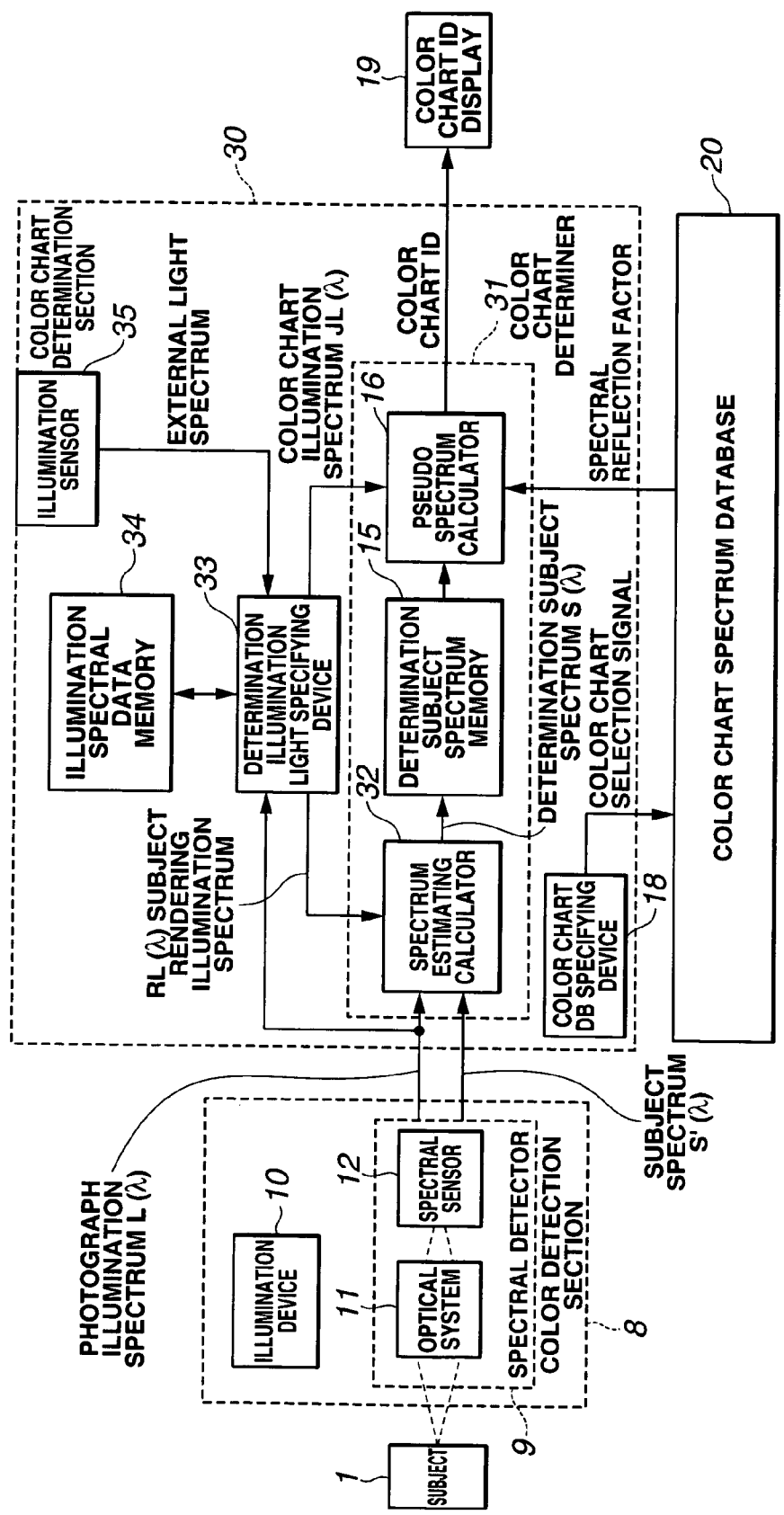
FIG. 4 is a block diagram illustrating a color chart processing apparatus in accordance with a third embodiment of the present invention.

FIG. 4 is a block diagram illustrating a color chart processing apparatus of a third embodiment of the present invention. As shown in FIG. 4, elements identical to those of FIG. 2 are designated with the same reference numerals, and the description thereof is omitted herein.

The present embodiment is a specific configuration example of the color chart processing apparatus, and calculates the color chart ID using not only information regarding the determination illumination light but also information regarding the photographing illumination light. The third embodiment of the present invention is different from the second embodiment of FIG. 2 in that a color chart determination section 30 is employed instead of the color chart determination section 13, and that the color chart determination section 30 receives from the color detection section 8 not only the subject spectrum but also a photographing illumination spectrum as the information of the photographing illumination light.

In the second embodiment, the subject is photographed under the photographing illumination light and the color chart determination is performed under illumination condition in which the color of the color chart is illuminated by a predetermined light source such as the D65 standard light source. In contrast, in the third embodiment, effective color chart determination is performed under any illumination light illuminating the subject and the color chart.

The color chart determination section 30 includes a illumination sensor 35 and an illumination spectral data memory 34 for measuring an external spectrum. Since the illumination spectral data memory 34 stores spectra of a variety of illumination light sources. For example, the illumination spectral data memory 34 stores spectral data of artificial light sources including an xenon lamp, and a fluorescent lamp, a halogen lamp, and natural light sources including sunlight during day time, sunlight during evening time, sunlight during cloudy day, blue sky, etc.

During color chart determination, a determination illumination light specifying device 33 selects not only color chart illumination light corresponding to the determination illumination light of the second embodiment, but also illumination light assumed to be illumination light of the subject during the color chart determination (hereinafter referred to as subject rendering illumination light). The determination illumination light specifying device 33 selects as the subject rendering illumination light one of the illumination light of the illumination device 10 used in the actual photographing of the subject 1, ambient light, and predetermined illumination pre-stored on the illumination spectral data memory 34.

The determination illumination light specifying device 33 provides a spectrum estimating calculator 32 in a color chart determiner 31 with a subject rendering illumination light spectrum of the subject rendering illumination light, and provides the pseudo spectrum calculator 16 with a color chart illumination spectrum as a spectrum of the color chart illumination light.

The spectrum estimating calculator 32 calculates a spectrum of a subject to be determined (corresponding to the determination subject spectrum in the second embodiment) from the input photographing illumination spectrum, the input photographing rendering illumination light spectrum, and the input subject spectrum, and outputs the calculated spectrum of the subject to the determination subject spectrum memory 15.

The operation of the present embodiment thus configured is described below.

As in the second embodiment, the color detection section 8 sets up a photographing area in a predetermined location in the subject 1 that is undergoing the color chart determination, and acquires a spectrum of that area. The color detection section 8 also acquires a photographing illumination spectrum as a spectrum of the illumination light of the illumination device 10 using a standard white board or the like. The color detection section 8 transmits to the color chart determination section 30 the acquired spectrum as a spectrum of the subject together with the acquired photographing illumination spectrum.

In the color chart determination section 30, an illumination sensor 35 acquires a spectrum of external light (external light spectrum) and supplies the external light spectrum to the determination illumination light specifying device 33. The determination illumination light specifying device 33 reads a predetermined illumination light spectrum stored on the illumination spectral data memory 34. If the color detection section 8 and the color chart determination section 30 are arranged in a close range, the illumination sensor 35 may acquire the spectrum of the photographing illumination light (photographing illumination spectrum).

In the present embodiment, the color detection section 8 transmits the spectrum of the photographing illumination light used for photographing. During the color chart determination, the photographing illumination spectrum is equalized with the color chart illumination spectrum so the color chart determination is performed using the same determination illumination as the photographing illumination. In accordance with the present embodiment, color chart determination is possible using illumination different from the actual photographing illumination. Any determination illumination light spectrum (color chart illumination spectrum) can be used in the color chart determination. When any color chart illumination is used during the color chart determination, determination illumination identical to the photographing illumination can be used.

The spectrum estimating calculator 32 receives the photographing illumination spectrum, the subject spectrum, and the subject rendering illumination light selected by the determination illumination light specifying device 33. The spectrum estimating calculator 32 calculates a subject determination spectrum $S(\lambda)$ under the subject rendering illumination light in accordance with the following equation (2).

$$S(\lambda)=\{S'(\lambda)/L(\lambda)\}\times RL(\lambda) \qquad (2)$$

where $S'(\lambda)$: subject spectrum under the illumination light of the illumination device 10, $L(\lambda)$: photographing illumination spectrum as the spectrum of the illumination light of the illumination device 10, and $RL(\lambda)$: subject rendering illumination spectrum Equation (2) is used to determine (reproduce) the subject spectrum when the subject 1 is photographed under the subject rendering illumination light. The subject spectrum $S(\lambda)$ determined by the spectrum estimating calculator 32 is supplied to the determination subject spectrum memory 15 for storage.

Meanwhile, the determination illumination light specifying device 33 provides the pseudo spectrum calculator 16 with the color chart illumination spectrum $JL(\lambda)$. In the same manner as in the second embodiment, the color chart determiner 31 determines the color chart ID that closest matches the color chart spectrum of any color in the specified color chart, in accordance with equation (1).

If the subject rendering illumination spectrum is equalized with the color chart illumination spectrum, the color chart determination is performed with the photographing illumination equalized with the determination illumination. Further, if the photographing illumination spectrum, the subject rendering illumination spectrum, and the color chart illumination spectrum are mutually equalized, the color chart determination can be performed with the actual photographing illumination equalized with the determination illumination.

In accordance with the present embodiment, any (separate) illumination light rays can be selected as illumination light illuminating the subject and the color chart. The color chart determination can be performed using not only the illumination light actually used to photograph the subject, but also using external light photographed with the illumination sensor, and stored illumination light of a light source used in a simulated photographing.

Thus, regardless of whether the color detector and the color chart determiner are remotely placed from each other or under the different illumination conditions, color chart determination can be performed at the same accuracy level as when the same light source is used for the subject and the color chart. Since the color chart illumination light illuminating the color chart is freely selected, color chart determination with illumination not identical in type to the illumination light of the subject can be performed. The light source in this case may be the one at the same location where the color chart determiner is placed, and the light source may be a predetermined light source. For example, even if the subject is in a variety of environments, the color chart determination can be performed under the constant illumination.

And now, in the color chart processing apparatus of each of the preceding embodiments, the color detector, the color chart determiner, the color chart spectrum database, and the color chart ID display can be in various configuration.

Figure 5:
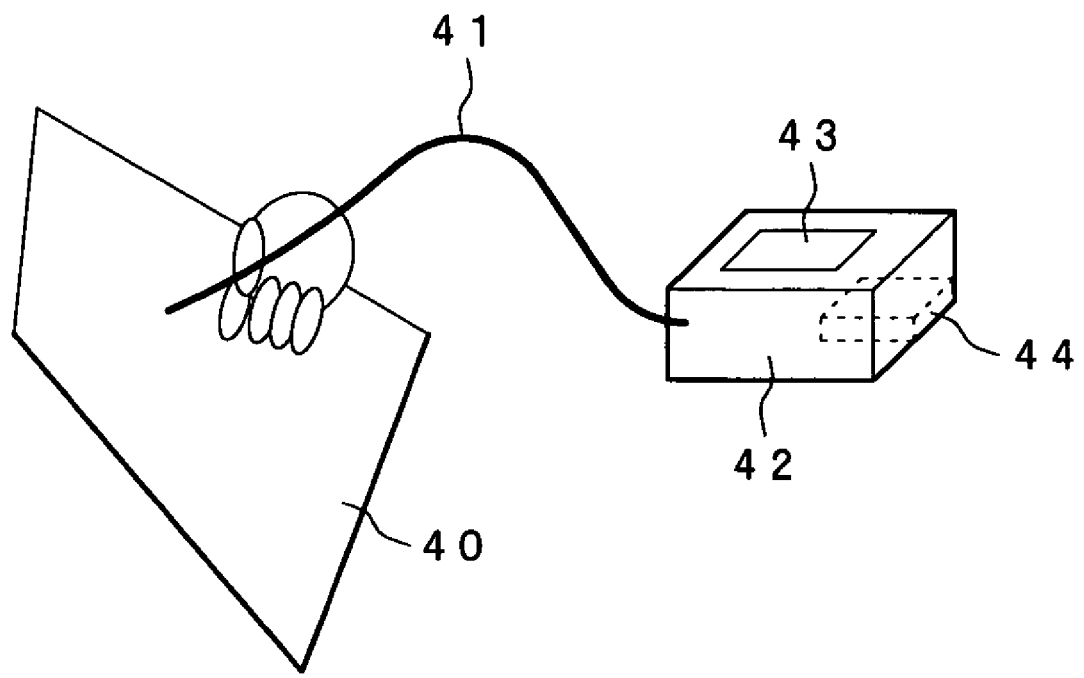
FIG. 5 illustrates a handy terminal, such as a PDA, including a color detector, a color chart determiner, a color chart spectrum database, and a color chart ID display.

For example, as shown in FIG. 5, the color detector, the color chart determiner, the color chart spectrum database, and the color chart ID display are incorporated into a handy terminal, such as a PDA.

As shown in FIG. 5, the color detector is composed of a fiber 41 and an unshown diffraction grating. The diffraction grating is housed in a PDA 42. A PDA monitor screen 43 serves as a color chart ID display. A card-type memory 44 is used as a memory in the color chart spectrum database. Since spectral data of the colors of the color chart is large, each card may store data of a particular color chart. The color chart spectral data may be compressed before storage.

Figure 6:
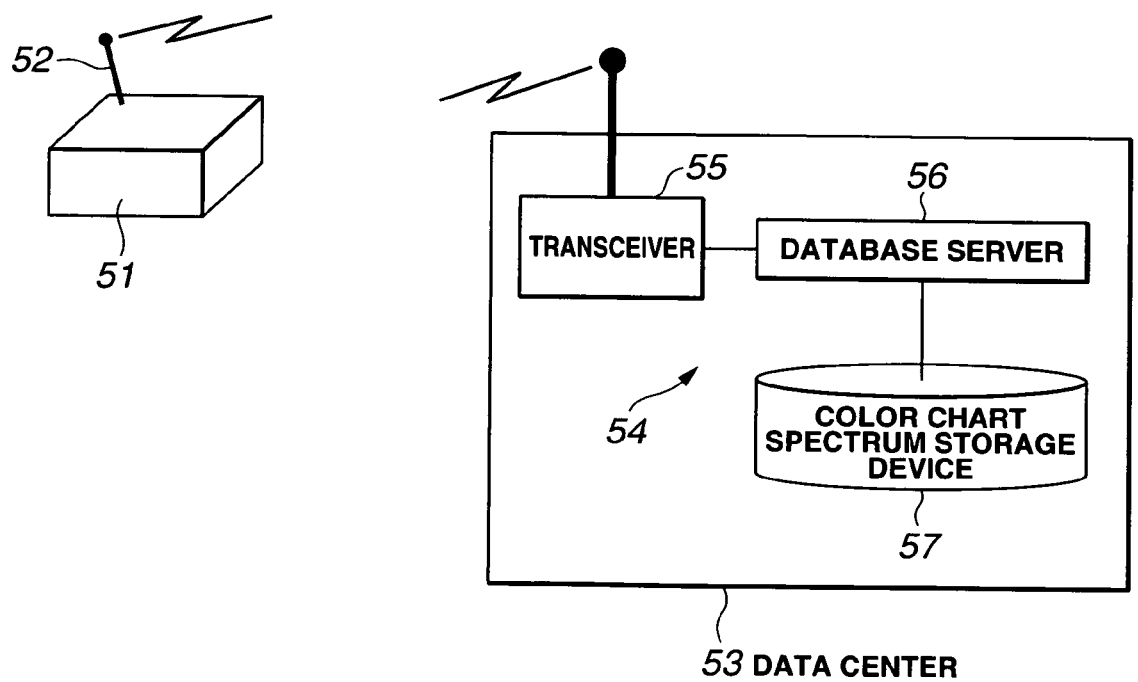
FIG. 6 is a block diagram of a configuration in which the color chart spectrum database is remotely located from the color chart determiner.

FIG. 6 illustrates a color chart spectrum database remotely located from a color chart determiner.

As shown in FIG. 6, a color chart spectrum database 54 is installed in a remote data center 53. The color chart spectrum database 54 includes a transceiver 55, a database server 56, and a color chart spectrum storage device 57. The color chart spectrum storage device 57 corresponds to the color chart spectrum storage in each of the preceding embodiments. The database server 56 transmits to a PDA 51 via the transceiver 55 the color chart spectral data of each color in the color chart stored on the color chart spectrum storage device 57.

On the other hand, the PDA 51 stores an unshown color determiner. The PDA 51 also includes an unshown transceiver for receiving the color chart spectral data from the color chart spectrum database 54, and performs the color chart determination with the color chart determiner using the color chart spectral data received via an antenna 52.

Figure 7:
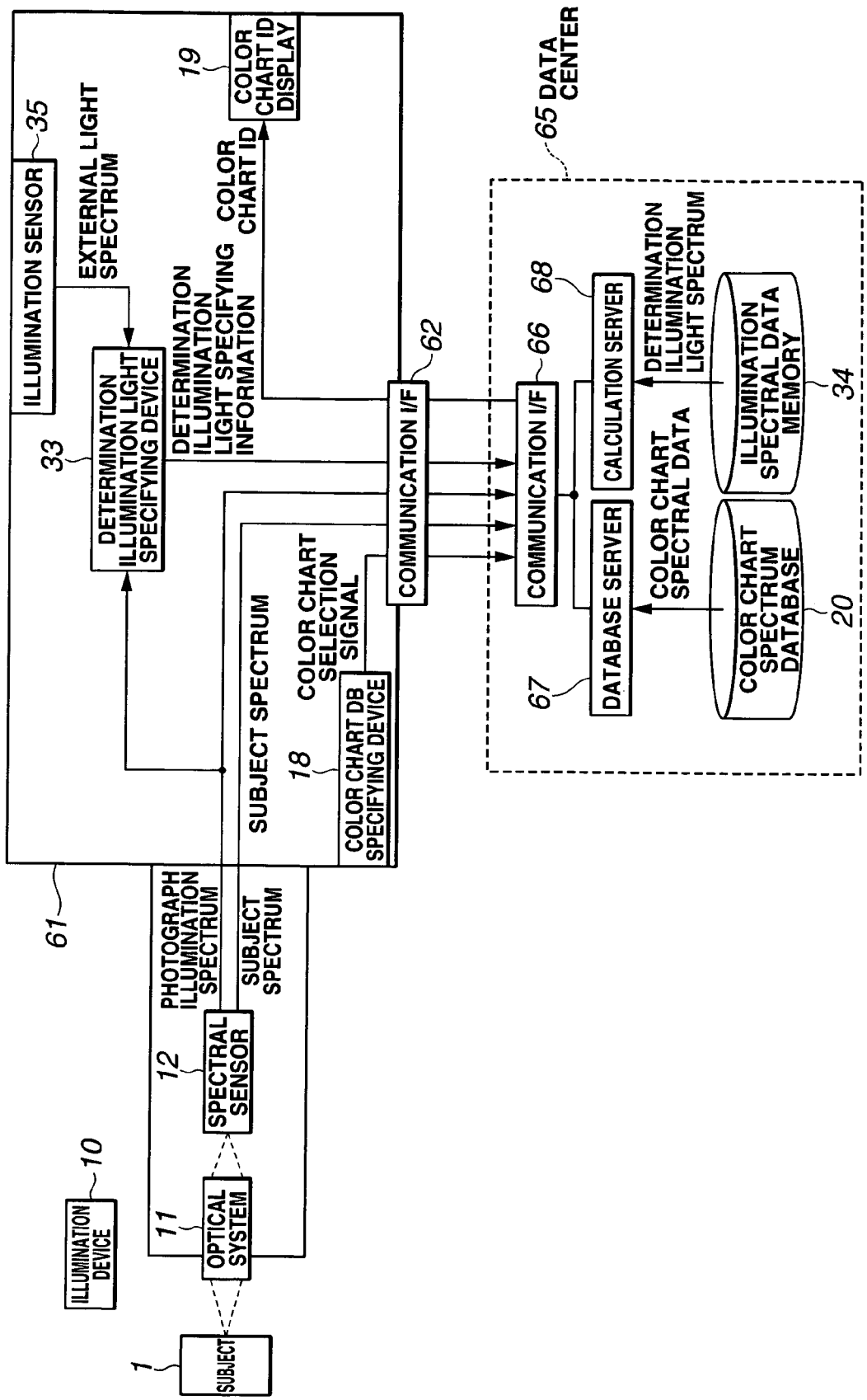
FIG. 7 is a block diagram illustrating the color chart determiner arranged in a remote data center.

Further, FIG. 7 illustrates a data center which includes a color chart determining device calculating equations (1) and (2) other than a terminal including a color detector and a color chart determiner. As shown in FIG. 7, a terminal 61 includes the optical system 11 and the spectral sensor 12 out of the elements of the color detection section 8 of FIG. 4. The terminal 61 photographs a subject, thereby obtaining a subject spectrum and a photographing illumination spectrum thereof. The terminal 61 includes the color chart DB specifying device 18, the illumination sensor 35, and the determination illumination light specifying device 33 out of the elements of the color chart determination section 30 of FIG. 4. The terminal 61 further includes the color chart ID display 19. Note that the determination illumination light specifying device 33 of FIG. 7 outputs information specifying an illumination spectrum (determination illumination light specifying information) rather than directly outputting an illumination spectrum for use in the color chart determination.

As described above, a portion corresponding to the color chart determiner 31 and a portion corresponding to the illumination spectral data memory 34 out of the elements of the color chart determination section 30 are arranged in a data center 65. The data center 65 includes the illumination spectral data memory 34 and the color chart spectrum database 20. Further, the data center 65 further includes a database server 67 and a calculation server 68, having a function corresponding to the function of the color chart determiner 31. The terminal 61 and the data center 65 exchange data with each other via a communication I/F 62 for the terminal 61 and a communication I/F 66 for the data center 65.

In the color chart processing apparatus thus constructed, the subject spectrum of the subject 1 obtained by the terminal 61, the photographing illumination spectrum, and information specifying the determination illumination light are transmitted to the data center 65 via the communication I/F 62. The data center 65 receives a variety of information from the terminal 61 via the communication I/F 66, and outputs the received information to the database server 67 and the calculation server 68. The database server 67 and the calculation server 68 read from the illumination spectral data memory 34 the determination illumination light spectrum in response to the determination illumination light specifying information, and the color chart spectral data of each color in the color chart specified by the color chart selection signal from the terminal 61, and then perform the calculation of equation (2). In this way, the database server 67 and the calculation server 68 determine the color chart ID as the color chart determination of the subject 1.

The color chart ID determined by the database server 67 and the calculation server 68 is transmitted to the terminal 61 via the communication I/F 66 and the communication I/F 62, and then displayed on the color chart ID display 19.

Thus, the color chart spectral data and the illumination spectral data, each having a large data size, are prepared in the data center so that the color chart determination of the color chart ID can be performed within the data center. Thus, even if the terminal 61 has a relatively small memory size and a relatively low computation ability, the color chart ID is easily acquired. Updated data is constantly used, and data maintenance is easily performed.

The communication I/F 62 and the communication I/F 66 are connected via a cable. Alternatively, the communication I/F 62 and the communication I/F 66 can be radio linked to each other.

FIG. 8 is a block diagram illustrating a color chart processing apparatus in accordance with the fourth embodiment of the present invention. As shown in FIG. 8, elements identical to those of FIG. 4 are designated with the same reference numerals and the description thereof is omitted herein.

In each of the preceding embodiments, the color detector obtains the subject signal by photographing a predetermined spot of the subject. In contrast, the present embodiment uses an electronic camera as a color detector, and obtains the subject signal from the image of the photographed subject.

As shown in FIG. 8, a color detection section 71 includes a multi-spectral camera 72 capable of capturing an image. The multispectral camera 72 captures spectral images in a frame sequential method using a band-pass filter disclosed in the previously mentioned Document 1. The number of bands of the spectral image is not limited to any particular one, and the number of bands is eight, for example. The multi-spectral camera 72 photographs the subject 1, thereby outputting the subject image to a color chart determination section 75. The color detection section 71 outputs a subject image per band, namely, a spectrum of the subject image (subject spectrum). The subject spectrum from the color detection section 71 is obtained on a per pixel basis of the subject image.

An illumination device 74 illuminates the subject 1. An illumination sensor 73 detects the spectrum of the illumination light directed to the subject 1, and outputs the spectrum as a photographing illumination spectrum.

The color detection section 71 is different from the color chart determination section 30 of FIG. 4 in that a determination image generator 76 is additionally attached. The determination image generator 76 is provided with the determination result of the color chart ID on a per pixel basis or on a per predetermined area basis of the captured image. The determination image generator 76 produces an image that maps the captured image to the color chart ID at each pixel or each predetermined area, and outputs the resulting image to the color chart ID display 19. The color chart ID display 19 displays the image that maps the captured image to the color chart ID at each pixel or each predetermined area.

Figure 9A:
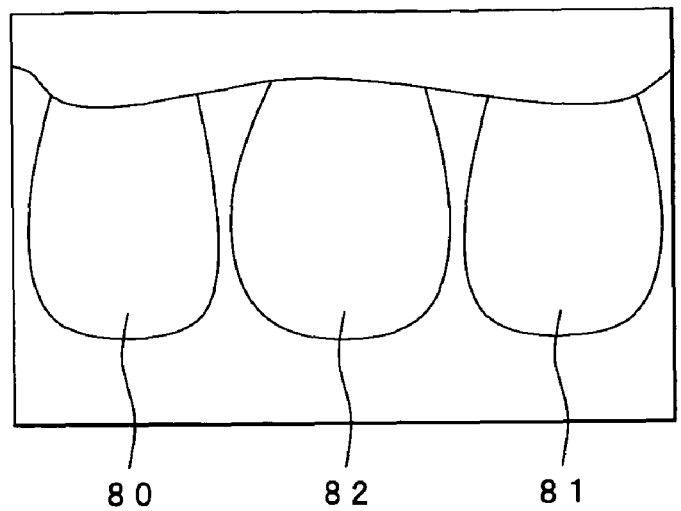
FIG. 9A illustrates operation of the fourth embodiment.
Figure 9B:
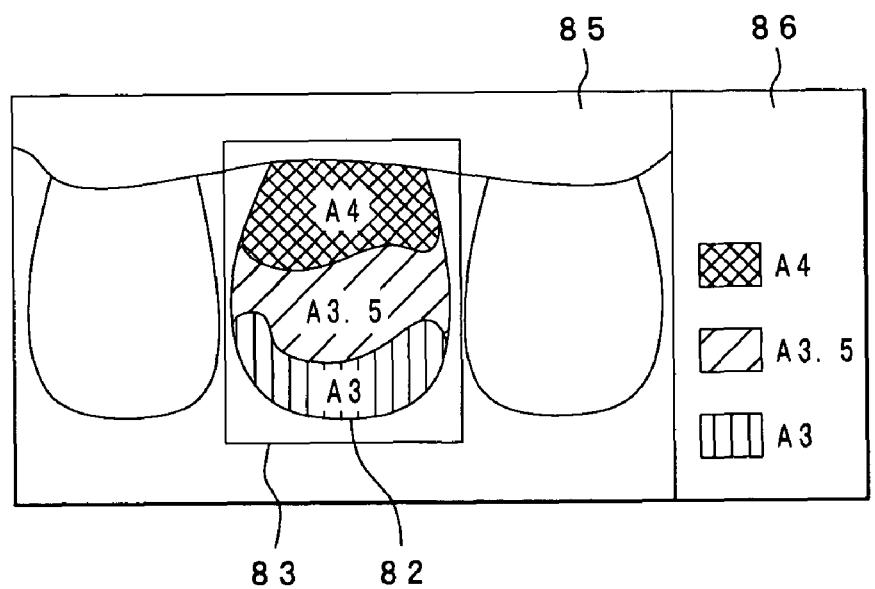
FIG. 9B illustrates the operation of the fourth embodiment.

Next, the operation of the embodiment thus constructed is described with reference to FIGS. 9A and 9B. FIG. 9A illustrates the subject image captured by the multi-spectral camera 72 and FIG. 9B illustrates a display example on a display screen of the color chart ID display 19.

The multi-spectral camera 72 obtains a two-dimensional spectral image of eight bands. FIG. 9A illustrates the subject image captured by the multi-spectral camera 72. The subject image of FIG. 9A shows three upper teeth 80 through 82.

At the same timing as the multi-spectral camera 72 photographs, the illumination sensor 73 detects the photographing illumination spectrum of the illumination light directed to the subject 1. The image signal of the subject image obtained by the multi-spectral camera 72 and the photographing illumination spectrum are supplied to the color chart determination section 75.

The color chart determination section 75 outputs the color chart ID on a per pixel basis of the subject image in accordance with equation (2). The calculation method of the color chart ID remains unchanged from that of each of the preceding embodiments. In this case, if the calculation process of the color chart ID is performed on the pixels on the whole area of the subject image, an extremely long period of process time is required. So, the color chart determiner 31 calculates the color chart ID of each pixel only in a color measurement area in the subject image. For example, if the color chart determination needs to be performed on a central tooth 82 out of the three teeth shown in FIG. 9A, a color measurement area 83 (see FIG. 9B) containing the central tooth 82 is set up.

The color chart determiner 31 performs the color chart determination on each pixel of the color measurement area 83 of the subject currently being photographed. The color chart determiner 31 outputs the determined color chart ID to the determination image generator 76. Based on the information of the input color chart ID on each pixel, the determination image generator 76 produces a determination image for displaying a distribution of the color chart ID. The determination image generator 76 supplies the produced determination image to the color chart ID display 19, thereby displaying the image on the display screen thereof.

FIG. 9B illustrates one example of the determination image displayed on the display screen 85. As shown in FIGS. 9A and 9B, a color is set for each color chart ID determined on a per pixel basis, and the color of each pixel in the subject image matches the color chart ID. FIG. 9B illustrates that color becomes different as shown in hatched portion, for example. An area of the same color chart ID is shown in the same color, and pixels of different color chart IDs are displayed by different colors. As shown in FIG. 9B, a crown color chart (shade guide) is used as a color chart. The pixels in the color measurement area have A3, A3.5, and A4 as values of the crown color chart. More specifically, of the tooth 82 measured, the crown color chart near the gum has A4, the crown color chart of a center portion of the tooth has A3.5, and the crown color chart of the end portion of the tooth has A3. The color distribution of the determination image is thus displayed.

Note that, the correspondence between the color of the determination image and the color chart ID is shown in a portion 86 of the display screen 85. FIG. 9B illustrates the color chart ID in the determination image.

In accordance with the present embodiment, the color chart determination of the color chart ID of a plurality of regions is performed using the multi-spectral camera. In the present embodiment, the multi-spectral camera of eight bands is used. The present invention is not limited to eight band camera. More number of bands may be used. Depending on an object, three bands of RGB provide sufficient accuracy.

The illumination light spectrum for photographing is detected by the illumination sensor. Alternatively, the spectrum is pre-measured and stored as data on a memory or the like. Alternatively, as disclosed in Document 2 (Japanese Unexamined Patent Application Publication No. 11-096333), a special chart for detecting the illumination spectrum may be used.

Incidentally, an illumination-type multi-spectral camera may be used as disclosed in Japanese Patent Application No. 2002-218863 filed by the applicant of this patent application.

Figure 10:
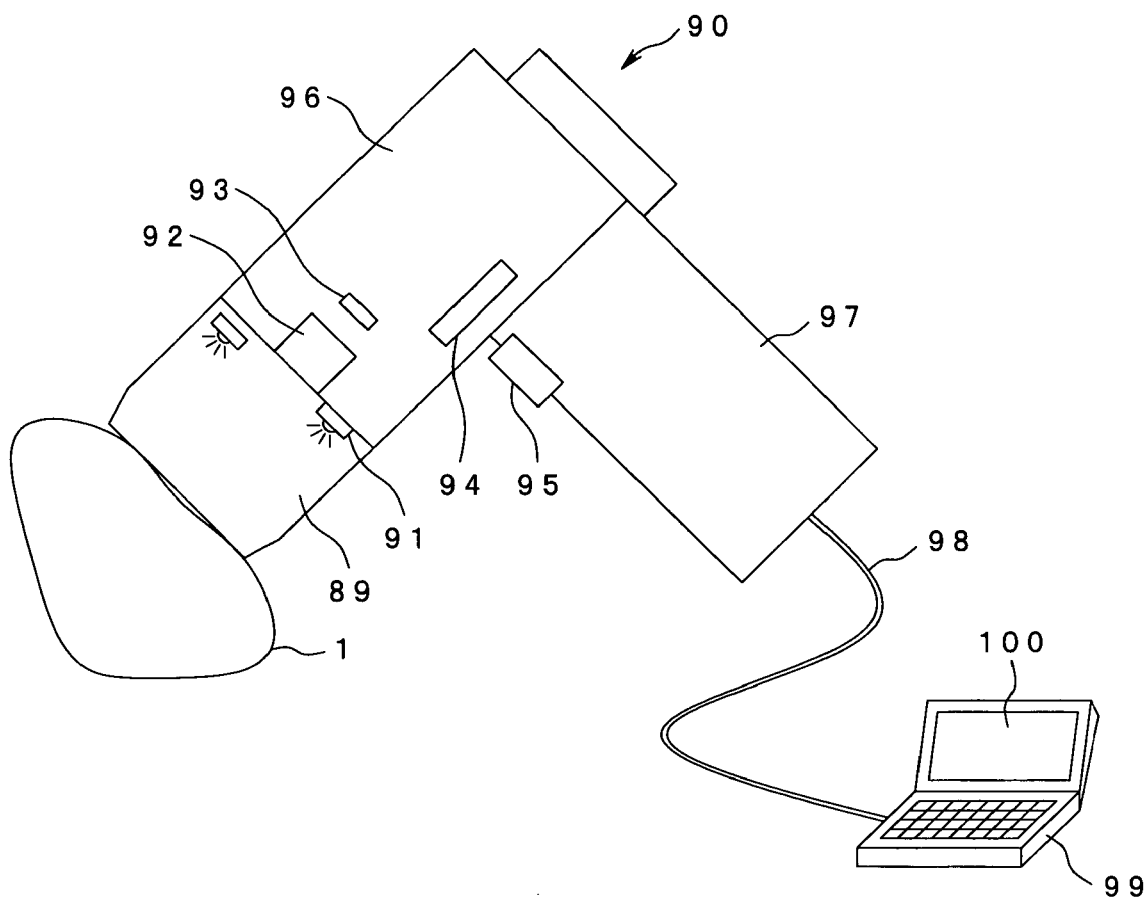
FIG. 10 illustrates a system incorporating an illumination-type multi-spectral camera.
Figure 11:
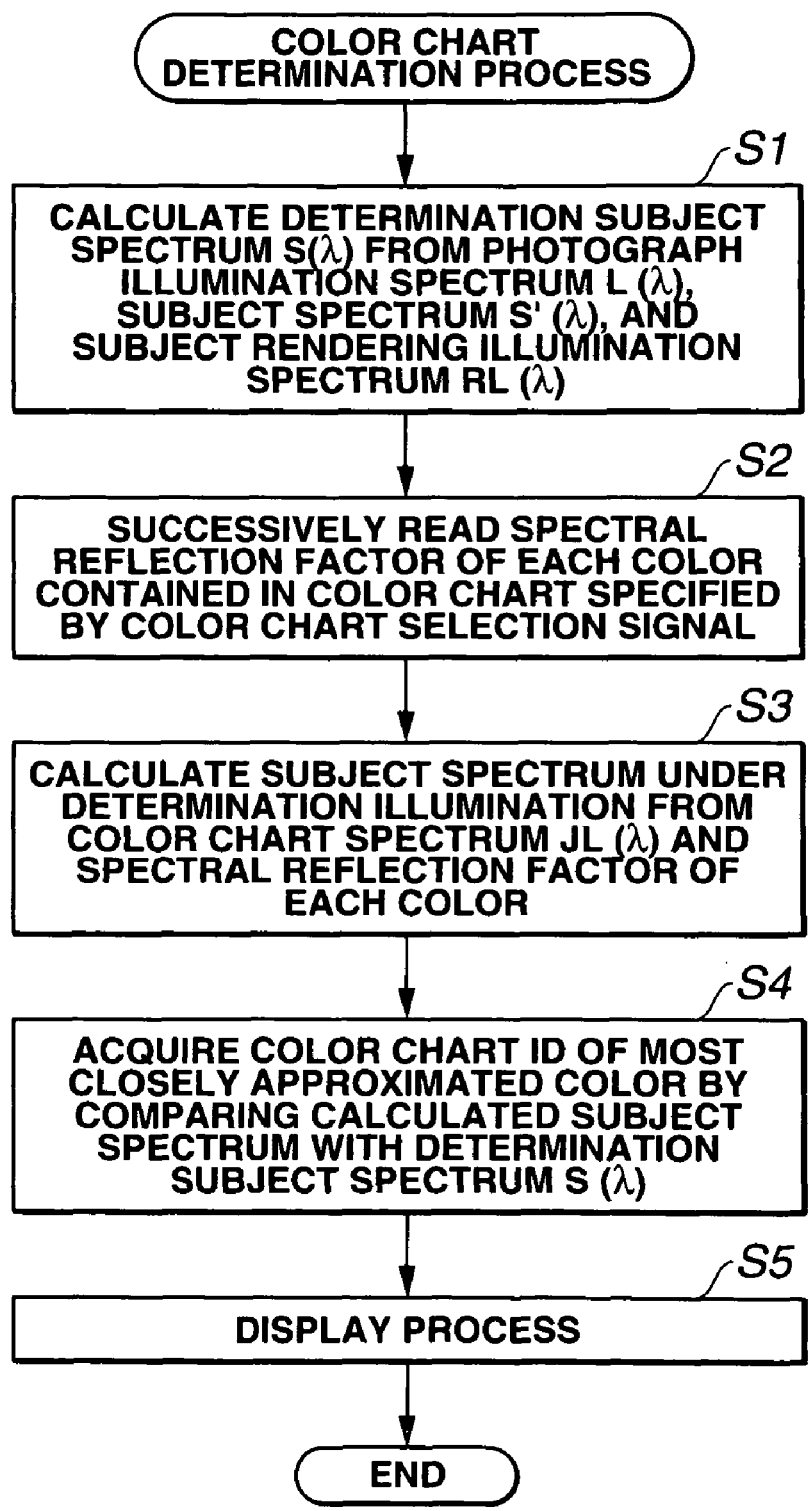
FIG. 11 is a flowchart illustrating a program process performed by a personal computer 99 of FIG. 10.

FIG. 10 illustrates a configuration employing such an illumination-type multi-spectral camera. FIG. 11 is a flowchart of a program process of a personal computer 99 of FIG. 10.

As shown in FIG. 10, an illumination-type multi-spectral camera 90 is employed as the color detection section 71. The functions of the color chart determination section 75 and the color chart spectrum database 20 of FIG. 8 are performed by the personal computer 99. The function of the color chart ID display 19 of FIG. 8 is performed by a display 100 in the personal computer 99.

The illumination-type multi-spectral camera 90 includes a body 96 and a handle 97. The handle 97 is provided with a photograph button 95. The body 96 includes at the front end portion thereof a focusing lens system 92 for focusing a light ray from the subject 1 into an image. A light receiving surface of a CCD 93 is arranged at a focusing position of the focusing lens system 92. A multi-colored LED illumination device 91 for illuminating the subject 1 is arranged on the front side of the body 96. A blocking member 89 for blocking external light from entering into the subject 1 is provided on the front end portion of the body 96. The body 96 houses an illumination spectral data memory 94. The illumination spectral data memory 94 stores illumination spectral data of the illumination light of the multi-colored LED illumination device 91.

When photographing starts in response to an operation of the photograph button 95, the multi-colored LED illumination device 91 directs LED illumination having a plurality of spectral characteristics to the subject 1. A light beam reflected from the subject 1 is focused into an image on the CCD 93 via the focusing lens system 92. The image is then converted into an image signal of the image of the subject. Meanwhile, the illumination spectral data based on the illumination light of the multi-colored LED illumination device 91 is read from the memory 94. In this way, the illumination-type multi-spectral camera 90 provides the same output as the one provided by the color detection section 71 of FIG. 8. The subject image and the illumination spectral data from the illumination-type multi-spectral camera 90 are transferred to the personal computer 99 via a cable 98.

The personal computer 99 performs the functions of the color chart spectrum database 20, the color chart determination section 75 and the color chart ID display 19 of FIG. 8. More specifically, using unshown CPU and memory, the personal computer 99 calculates equation (2) on the supplied photographing illumination spectrum, subject spectrum, and subject rendering illumination spectrum, thereby calculating the subject determination spectrum S ($\lambda$) under the subject rendering illumination light (step S1 in FIG. 11).

The personal computer 99 then reads the color chart spectral data (spectral reflection factor) stored on a recording medium such as an unshown hard disk (step S2), and calculates the subject spectrum with the supplied color chart illumination spectrum (step S3). The personal computer 99 compares the subject spectrum with the determination subject spectrum, thereby determining the color chart ID providing a color chart spectrum closest matching the color chart spectrum of any color in the specified color chart (step S4).

Thus, based on the subject image and the illumination spectral data input via the cable 98, the personal computer 99 displays on the display 100 a determination image representing the color chart ID on a per pixel basis for the color measurement area of the subject image (step S5).

The present embodiment is thus configured using the illumination-type multi-spectral camera.

Figure 12:
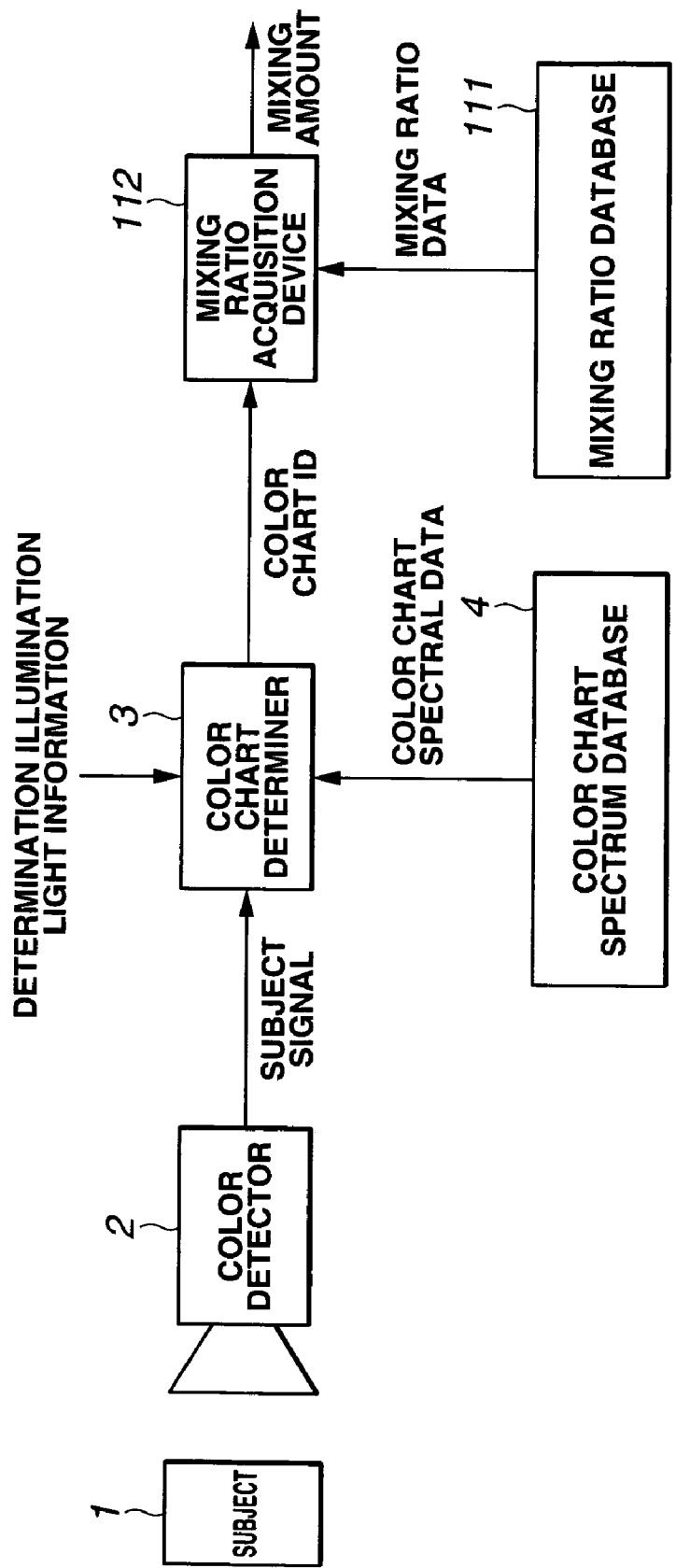
FIG. 12 is a block diagram illustrating an application example of the color chart processing apparatus.

FIG. 12 is a block diagram illustrating an application of the color chart processing apparatus. As shown in FIG. 12, elements identical to those of FIG. 1 are designated with the same reference numerals, and the description thereof is omitted herein.

In a configuration of FIG. 12, the color chart processing apparatus of the first embodiment is included. A color specified by the color chart ID is obtained by mixing a plurality of colors. No apparatuses that determine a mixing amount for producing a color of a predetermined color chart ID have been conventionally available. FIG. 12 illustrates the configuration in which a determined color chart ID is used. The configuration applies to determine the mixing amount of a material for obtaining a color indicated in the color chart determination result of the color chart ID.

For example, in the dentistry field, an artificial tooth is produced based on the determined crown color chart (shade guide). In this case, a plurality of porcelains need to be mixed in the production of an artificial tooth. As shown in FIG. 12, the mixing amount of a porcelain is determined during the production of the artificial tooth.

A mixing ratio database 111 stores information of the mixing ratio on a per color chart ID basis to produce an intended color. For example, on a per color chart ID basis of the crown color chart, the mixing ratio database 111 stores information regarding a porcelain required to manufacture an artificial tooth. The information regarding the mixing ratio stored on the mixing ratio database 111 is supplied to a mixing ratio acquisition device 112 as mixing ratio data. The mixing ratio acquisition device 112 reads the mixing ratio data from the mixing ratio database 111 using the color chart ID supplied from the color chart determiner 3, and outputs the mixing amount of each porcelain for obtaining the intended color.

In the present embodiment thus constructed, the color chart ID indicating which color of the specified color chart corresponds to the color of the subject is obtained from the color chart determiner 3. The mixing ratio acquisition device 112 reads the mixing ratio data from the mixing ratio database 111, and outputs the mixing ratio data as the mixing amount of each porcelain to obtain the resulting determination color.

Thus, in the example of FIG. 12, the mixing amount of the porcelains for obtaining the same color as the resulting determination color for the object to be determined is automatically determined. In the example of FIG. 12, the mixing amount of the porcelains is determined during the production of the artificial tooth. This embodiment is obviously applicable to any application where a plurality of materials are mixed to produce an desired color. For example, this embodiment is applicable to paint mixing operation.

Figure 13:
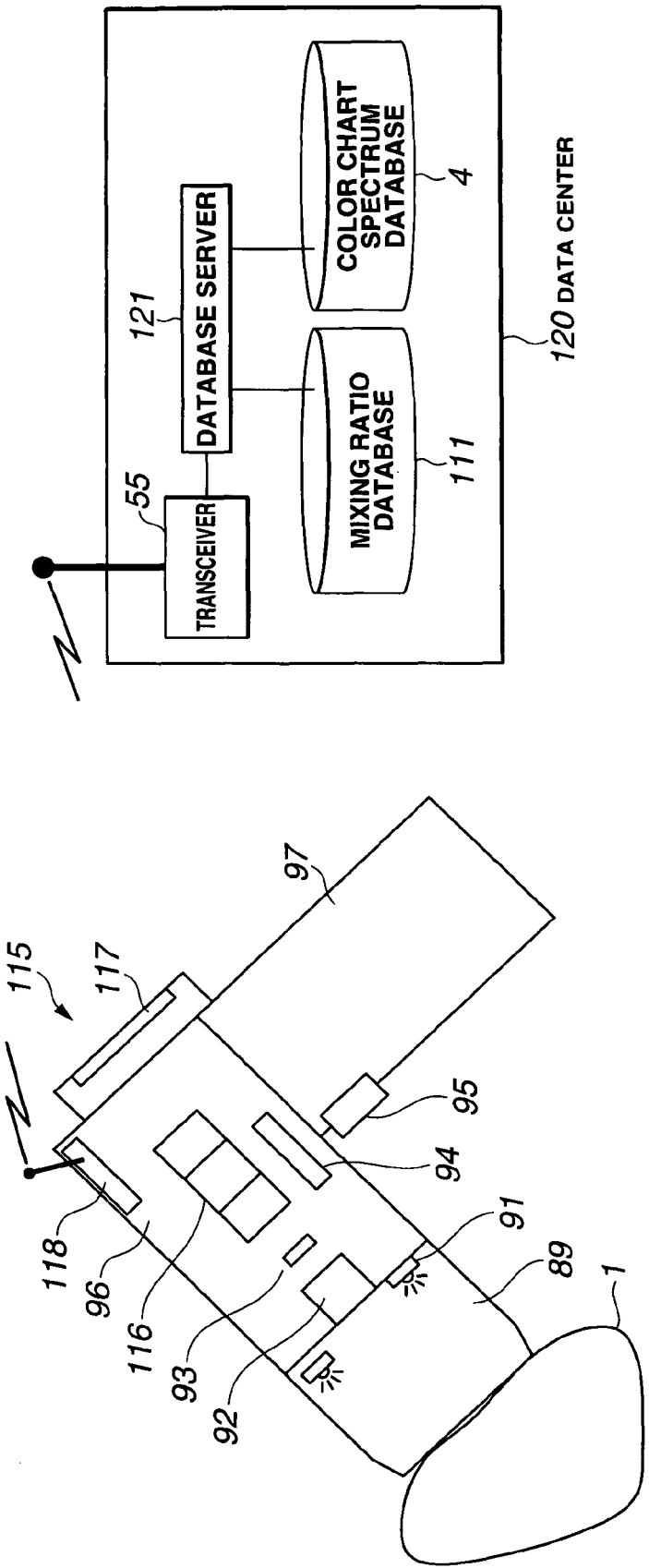
FIG. 13 illustrates a configuration of the example in FIG. 12 in which the illumination-type multi-spectral camera is used in the same manner as FIG. 10.

FIG. 13 illustrates a system in which the color chart processing apparatus of FIG. 12 is constructed using the illumination-type multi-spectral camera of FIG. 10. As shown in FIG. 13, elements identical to those described with reference to FIG. 10 are designated with the same reference numerals and the description thereof is omitted herein.

As shown in FIG. 13, the functions of the color detector 2 and the color chart determiner 3 of FIG. 12 are performed by a multi-spectral camera 115, and the remaining functions are performed by the elements in a data center 120. The multi-spectral camera 115 is different from the illumination-type multi-spectral camera 90 of FIG. 10 in that a color chart determination circuit 116, a display 117, and a transceiver circuit 118 are additionally included.

The data center 120 includes the color chart spectrum database 4 of FIG. 13, a mixing ratio database 111, and a database server 121 corresponding to the mixing ratio acquisition device 112 of FIG. 12.

Note that, if the multi-spectral camera 115 can afford to house a memory of sufficient memory size and a calculation circuit, it is apparent that the structure of the data center 120 may be fully integrated into the multi-spectral camera 115.

With such an arrangement, the database server 121 reads color chart spectral data stored on the color chart spectrum database 4, and transfers the color chart spectral data to the multi-spectral camera 115 via a transceiver 55. A transceiver circuit 118 of the multi-spectral camera 115 receives the color chart spectral data transmitted from the data center 120, and outputs the received color chart spectral data to the color chart determination circuit 116.

The color chart determination circuit 116 corresponds to the color chart determiner 3 of FIG. 12, and calculates the color chart ID corresponding to the color of the subject 1 using the subject spectrum obtained by photographing the subject 1, the photographing illumination spectrum from the memory 94 and the color chart spectral data from the data center 120. The color chart ID determined by the color chart determination circuit 116 is transmitted to the data center 120 via the transceiver circuit 118.

The database server 121 in the data center 120 determines the mixing amount for producing the color indicated by the color chart ID, based on the color chart ID from the multi-spectral camera 115, and the mixing ratio data stored on the mixing ratio database 111. The database server 121 transmits to the multi-spectral camera 115 the information regarding the determined mixing amount together with the information of the color chart ID.

The multi-spectral camera 115 transfers to the display 117 the color chart ID and the information of the mixing amount received by the transceiver circuit 118 to display these pieces of information on the screen of the display 117.

Thus, in the example of FIG. 13, the information of the mixing amount determined based on the information from the mixing ratio database 111 in a remote place is transmitted to the multi-spectral camera 115 via the radio link so that the information of the mixing amount is displayed together with the color chart ID.

Figure 14:
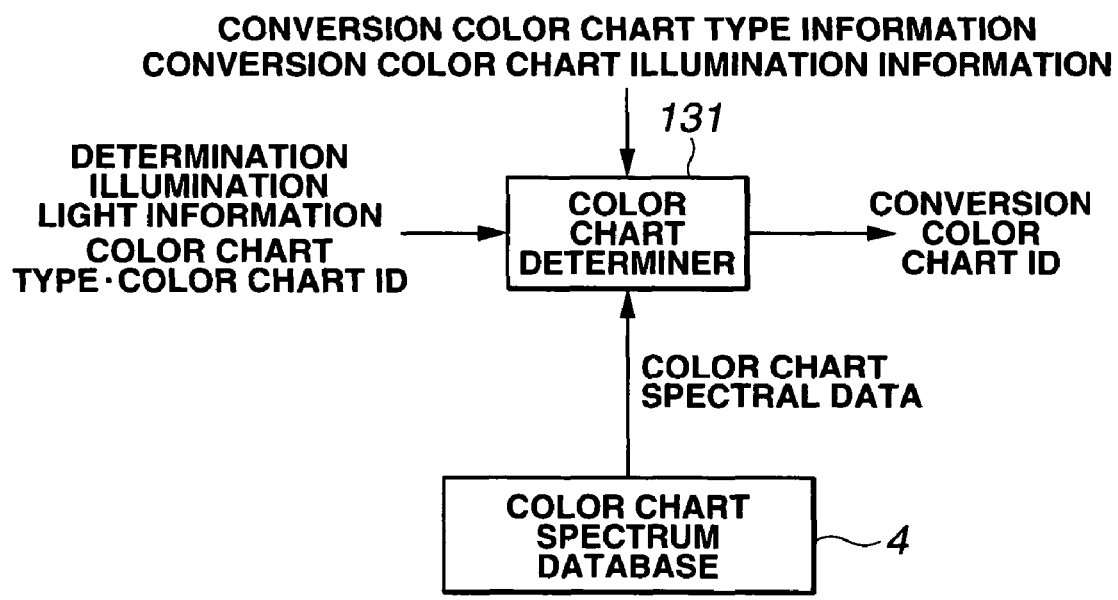
FIG. 14 is a block diagram illustrating a color chart processing apparatus in accordance with a fifth embodiment of the present invention.

FIG. 14 is a block diagram illustrating a color chart processing apparatus in accordance with a fifth embodiment of the present invention. As shown in FIG. 14, elements identical to those of FIG. 1 are designated with the same reference numerals and the description thereof is omitted herein.

The present embodiment converts, for example, the color chart ID obtained by the color chart processing apparatus of FIG. 1 into a color chart ID of another color chart. For example, in the printing field, a color chart unique to printing applications (DIC color chart) is typically used different from a color chart of another field. The present embodiment is applicable to such an application.

A color chart determiner 131 receives determination illumination light information, and information regarding a color chart type and a color chart ID. The color chart determiner 131 determines a subject spectrum from these pieces of information. The color chart determiner 131 also receives conversion color chart type information, and reads from the color chart spectrum database 4 color chart spectral data of a color chart based on the conversion color chart type information. The color chart determiner 131 calculates the color chart ID of the color chart specified by the conversion color chart type information by calculating equation (1) based on the calculated subject spectrum, the read color chart spectral data, and conversion color chart illumination information for use in determination of a new color chart. The color chart determiner 131 then outputs the calculated color chart ID.

In the embodiment thus constructed, the color chart determiner 131 receives the color chart determination result that has used predetermined determination light for the color of a predetermined subject. The color chart determiner 131 determines an original subject spectrum from the input color chart ID. The color chart determiner 131 calculates equation (1) on the resulting determination subject spectrum, and outputs the color chart ID in which the color chart specified by the conversion color chart type information is used.

Thus, in accordance with the present embodiment, the color chart ID of a predetermined color chart can be converted into a color chart ID of another color chart.

Figure 15:
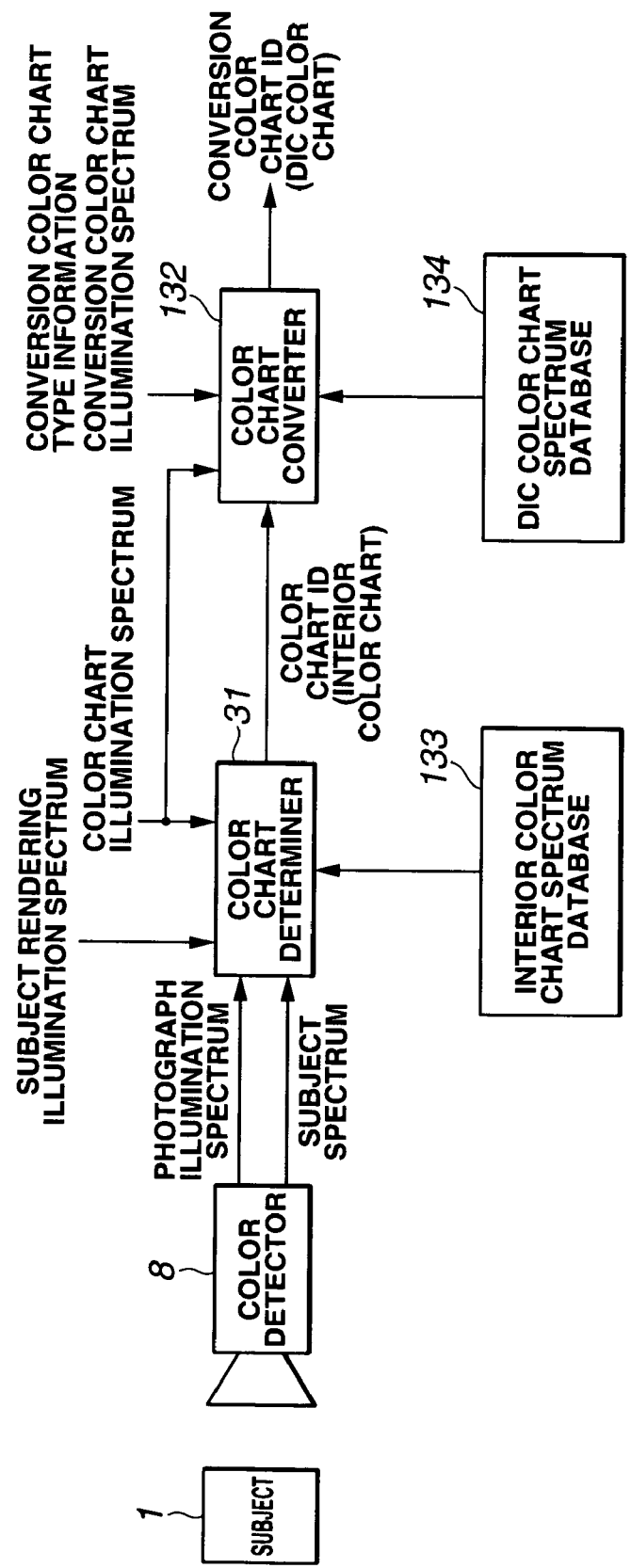
FIG. 15 is a block diagram illustrating a color chart processing apparatus in accordance with a sixth embodiment of the present invention.

FIG. 15 is a block diagram of a color chart processing apparatus in accordance with a sixth embodiment of the present invention. As shown in FIG. 15, elements identical to those of FIG. 4 are designated with the same reference numerals and the description thereof is omitted herein.

In the present embodiment, the fifth embodiment is applied to the third embodiment. As shown in FIG. 15, the interior color chart is converted into the DIC color chart. Any color chart can be converted as long as the color chart is stored on a spectrum database.

The present embodiment is different from the third embodiment in that a color chart converter 132 is added to the structure of FIG. 4. The function of an interior color chart spectrum database 133 or a DIC color chart spectrum database 134 are limited to only the function of outputting spectral data relating the interior color chart or spectral data relating to the DIC color chart from the color chart spectrum database 20 of FIG. 4.

The color chart converter 132 receives a color chart ID from the color chart determiner 31 while also receiving information of the color chart illumination spectrum for use in the color chart determination of the color chart determiner 31. The color chart converter 132 also receives information, regarding the DIC color chart, as the conversion color chart type information.

The color chart converter 132 calculates the following equation (3) based on the received color chart ID and color chart illumination spectrum, and the conversion color chart illumination spectrum and the spectral data of the DIC color chart. Here, n minimizing φ(n) in equation (3) is determined as a color chart ID of the DIC color chart. The color chart converter 132 outputs the determined color chart ID as a conversion color chart ID.

$$\phi(n)=|CN1(N1,\lambda)\times jL1(\lambda)-CN2(n,\lambda)\times jL2(\lambda)|^2 \quad (3)$$

where λ: wavelength
n: color chart ID
CN1(Nλ): color chart spectral data with interior color chart ID being N1
N1: interior color chart ID
CN2(n,λ): color chart spectral data with the DIC color chart ID being n
jL1(λ): determination illumination light spectrum of the interior color chart (color chart illumination spectrum)
jL2(λ): determination illumination light spectrum of D5C color chart (color chart illumination spectrum)

The conversion color chart ID and the color chart ID from the color chart determiner 31 are supplied to the color chart ID display 19 of FIG. 4. The color chart ID is thus displayed for the color of the subject 1 when each of the interior color chart and the DIC color chart is used.

In accordance with the present embodiment, one determined color chart ID can be converted into the color chart ID of a completely different color chart. In this case, the color chart ID is converted based on the calculation of the spectral information of the color chart ID. The determination illumination light for acquiring the converted color chart ID is not necessarily the same as the determination illumination light used in the color chart determination prior to the conversion, and any determination illumination light can be set.

Figure 16:
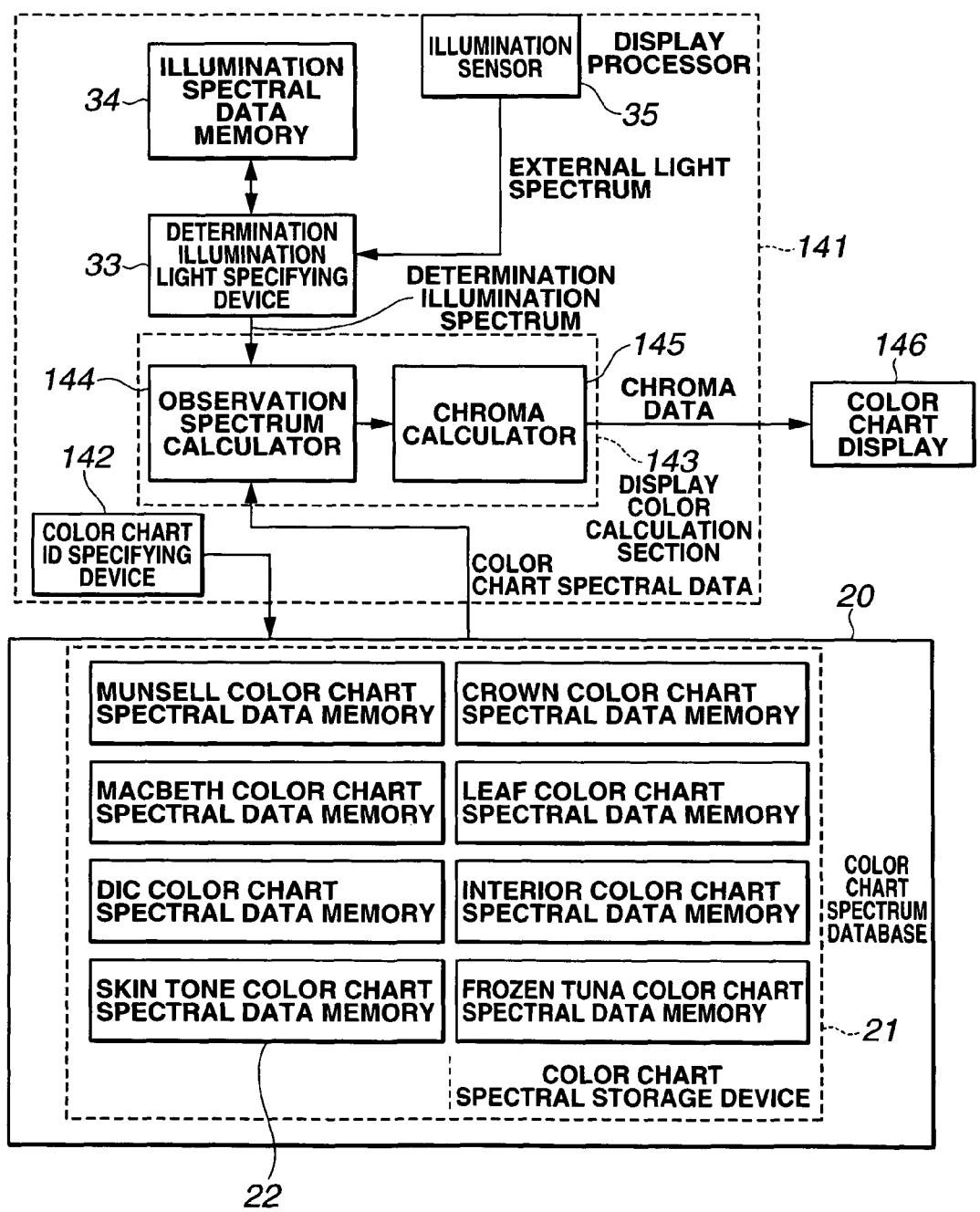
FIG. 16 is a block diagram illustrating an application example of the color chart processing apparatus.

FIG. 16 is a block diagram illustrating an application example of the color chart processing apparatus. As shown in FIG. 16, elements identical to those of FIG. 4 are designated with the same reference numerals and the description thereof is omitted herein.

As shown in FIG. 16, the color chart processing apparatus of the third embodiment is incorporated. Many color charts are present, and many colors are contained in each color chart. So, it is thus difficult to recognize quickly the color of a particular color chart ID in a desired color chart. Conventionally, no apparatuses that can easily recognize the color of any color chart ID have been available. The color chart processing apparatus of FIG. 16 enables the color of a specified color chart ID to be displayed under illumination light of on the location of operation or under any illumination light.

A display processor 141 includes a color chart ID specifying device 142 and a display color calculation section 143 instead of the color chart DB specifying device 18 and the color chart determiner 31 in the color chart determination section 30 of FIG. 4. The display color calculation section 143 includes an observation spectrum calculator 144 and a chroma calculator 145. The observation spectrum calculator 144 receives the determination illumination light spectrum from the determination illumination light specifying device 33.

In response to a user operation, the color chart ID specifying device 142 specifies the color chart spectral data read from the color chart spectrum database 20. The color chart ID specifying device 142 outputs a selection signal specifying a color chart and a color chart ID. The color chart spectrum database 20 outputs the color chart spectral data responsive to the input selection signal to the observation spectrum calculator 144 in the display color calculation section 143.

The observation spectrum calculator 144 determines a spectrum of the color of the color chart ID specified by the color chart ID specifying device 142 under the determination illumination light, by multiplying the determination illumination light spectrum by the color chart spectral data. The observation spectrum calculator 144 outputs the determined spectrum to the chroma calculator 145. The chroma calculator 145 converts the input spectrum into chroma information (XYZ, xy, L*a*b*, etc.) and outputs the chroma information to a color chart display 146 as chroma data.

Figure 17:
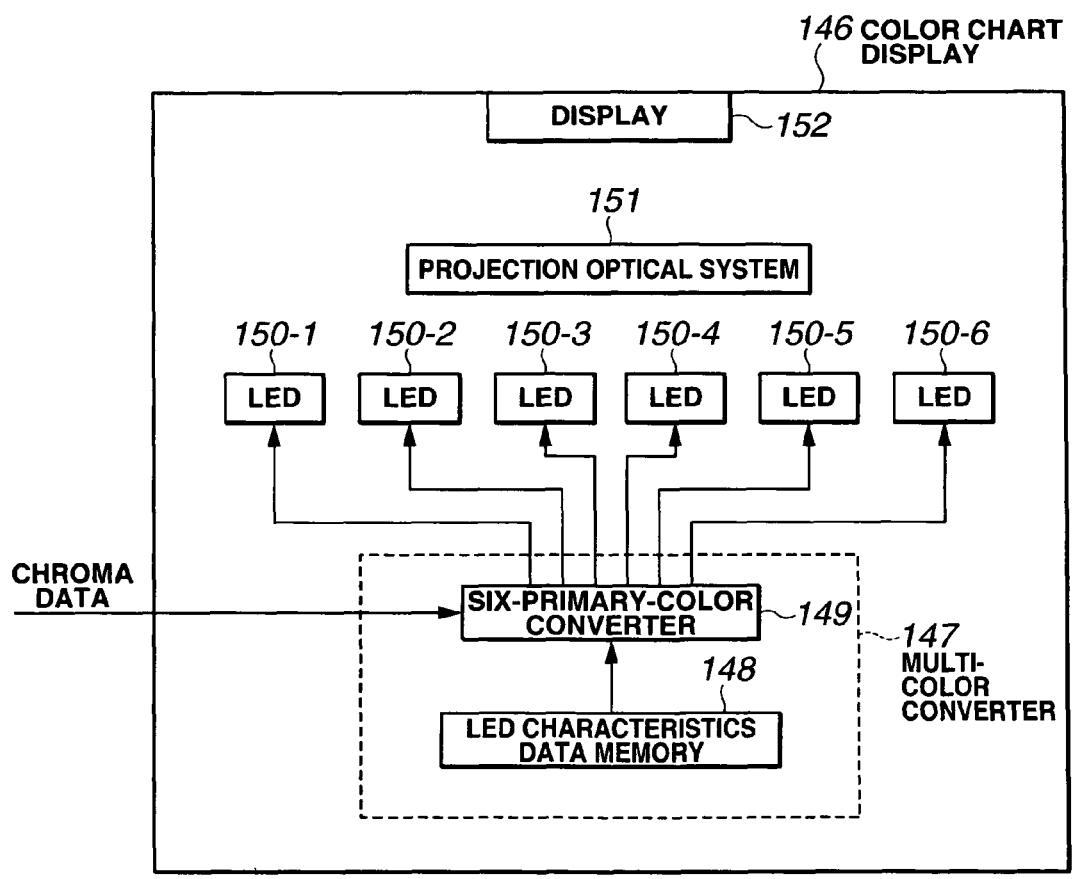
FIG. 17 is a block diagram specifically illustrating a color chart display 146 of FIG. 16.

FIG. 17 is a block diagram specifically illustrating the configuration of the color chart display 146 of FIG. 16.

As shown in FIG. 17, six LEDs displaying six primary colors are used for the color chart display 146. As shown in FIG. 17, the color chart display 146 includes a multi-color converter 147, LED 150-1 through LED 150-6 a projection optical system 151, and a display 152.

The multi-color converter 147 includes an LED characteristics data memory 148, and a six-primary-color converter 149. The chroma data from the chroma calculator 145 is input to the six-primary-color converter 149. The LEDs 150-1 through 150-6 are different from each other in spectral characteristics, and emit different primary color light rays. The LED characteristics data memory 148 stores characteristics of LEDs 150-1 through 150-6. The six-primary-color converter 149 converts the chroma data into signals (primary color signals) representing six primary colors in accordance with a conversion method disclosed in detail in Document 3 (Japanese Unexamined Patent Application Publication No. 2000-253264) and Document 4 (Japanese Unexamined Patent Application Publication No. 2000-338950). The six primary colors may be red, blue, green, cyan, yellow and magenta, for example,.

The six primary color signals from the six-primary-color converter 149 are supplied to the LEDS 150-1 through 150-6 emitting color light rays responsive to the six primary color signals. In response to the primary color signals, the LEDs 150-1 through 150-6 emit respective light rays. The light rays emitted from the LEDs 150-1 through 150-6 are projected to the display 152 through the projection optical system 151.

Figure 18:
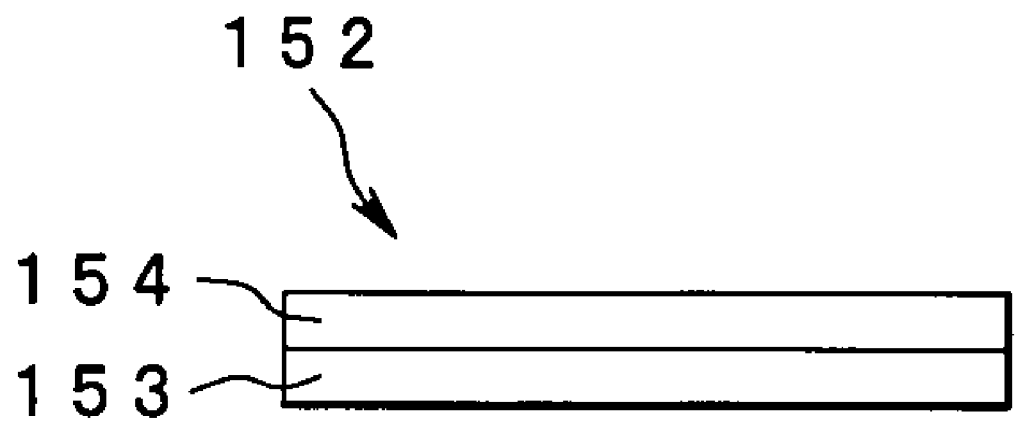
FIG. 18 specifically illustrates a section of a display 152 of FIG. 17.

FIG. 18 is a sectional view illustrating a specific configuration of the display 152. As shown in FIG. 18, the display 152 includes a lenticular lens 153 and a diffusion plate 154. The primary color light rays from the LEDs 150-1 through 150-6 entering from the lenticular lens 153 become substantially parallel light rays and are then output from the diffusion plate 154. By synthesizing the six primary color light rays on the display 152, a uniform multi-color display is presented on the entire display screen of the display 152. The display 152 may uses a screen (display screen) of the same size as the color chart.

As shown in FIG. 17, the display 152 is a rear-projection type, and subject to a directivity of the screen. For this reason, the display 152 includes the lenticular lens 153 and the diffusion plate 154 to correct directivity.

With this arrangement, a user specifies a color chart ID of the color to be checked on the color chart ID specifying device 142. The selection signal from the color chart ID specifying device 142 is supplied to the color chart spectrum database 20, and the color chart spectrum database 20 supplies the color chart spectral data (spectral reflection factor) of the specified color chart ID to the observation spectrum calculator 144. For example, in response to the user operation, the determination illumination light specifying device 33 selects one of an external light spectrum of external light detected by the illumination sensor 35 and a spectrum stored on the illumination spectral data memory 34, and supplies the selected spectrum to the observation spectrum calculator 144 as the determination illumination light spectrum. The observation spectrum calculator 144 determines the spectrum of the color of the specified color chart ID by multiplying the color chart spectral data and the determination illumination light spectrum, and then outputs the determined spectrum to the chroma calculator 145.

The chroma calculator 145 converts the input spectrum into chroma information. The chroma calculator 145 outputs the determined chroma data to the color chart display 146. The multi-color converter 147 in the color chart display 146 converts the chroma data into the six primary color signals. The six primary color signals are respectively supplied to the LEDs 150-1 through 150-6. In response, the six primary color light rays are output, and then displayed on the display 152 via the projection optical system 151.

The chroma data is converted into the six primary color signals. The output light rays from LEDs 150-1 through 150-6 for outputting the six primary color light rays are synthesized into a display color. A color range displayable is wide enough, and an accurate color reproduction based on the color chart ID is performed on the multi-color display screen.

As shown in FIG. 16, the color of the color chart is faithfully represented under the illumination of the external light. Since the color of the color chart ID responsive to the illumination spectrum of the external light is reproduced using the illumination sensor, the color chart is displayed on the screen as if the color chart is actually present there. Not only the spectral data from the illumination sensor but also the spectral data stored on the illumination spectral data memory is used as the determination illumination light spectrum. In such a case, the color of the color chart under any illumination light can be displayed.

By setting the screen of the color chart ID display displaying multi colors to be approximately identical in size to the actual color chart, more accurate determination is possible. A hologram screen or the like, may be used instead of the lenticular lens. The diffuse plate may be reinforced against external light by tinting the diffuse plate or by mirror finishing the surface of the diffuse plate. The display may be constructed of a device such as a self-emitting FED or an organic EL. Alternatively, the display may be constructed of an LCD, or a multi-color primary display such as the ones disclosed in Document 5 (Japanese Unexamined Patent Application Publication No. 2000-25326) and Document 4 (Japanese Unexamined Patent Application Publication No. 2000-338950).

By combining the fourth embodiment of FIG. 8 with the application example of FIG. 16, the color of the determined color chart ID is displayed in response to the display of the image of the subject.

Figure 19:
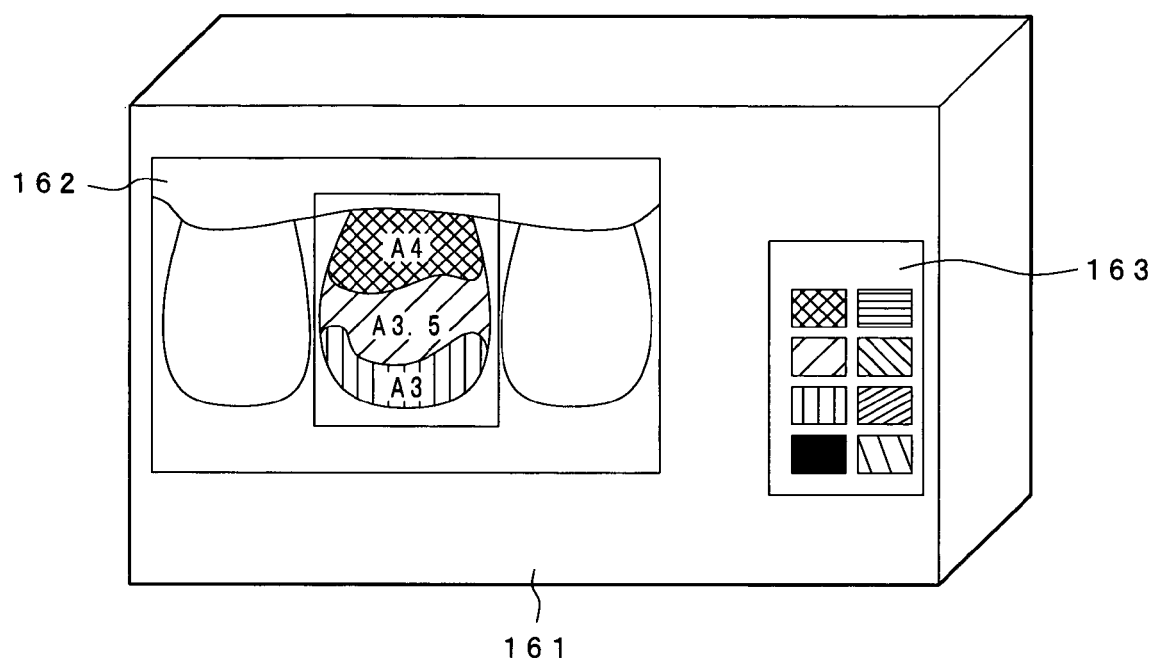
FIG. 19 illustrates another example of the color chart display 146.

More specifically, an element similar to the display color calculation section 143 of FIG. 16 may be incorporated instead of the determination image generator 76 of FIG. 8. The chroma data responsive to the color chart ID determined on a per pixel basis of the subject image is thus obtained. In such a case, a display 161 of FIG. 19 is used. As shown in FIG. 19, the display 161 displays the same image as shown FIG. 9B. In a way similar to FIGS. 9A and 9B, difference in color is represented in difference in hatching in FIG. 19.

The display 161 of FIG. 19 includes an image display area 162 for displaying the subject image in multi primary colors, and a color chart display area 163 for displaying each color example of the color chart. In a way similar to FIG. 9B, the image display area 162 displays a color corresponding to the color chart ID with the subject image overlapping thereon. In this case, as shown in FIG. 9B, a plurality of colors are used to simply distinguish between a plurality of color chart IDs. As shown in FIG. 19, however, displayed is the color that would be expected when the color specified by the color chart ID is seen under the determination illumination light or any illumination, as in the color chart display 146 of FIG. 17.

Figure 20:
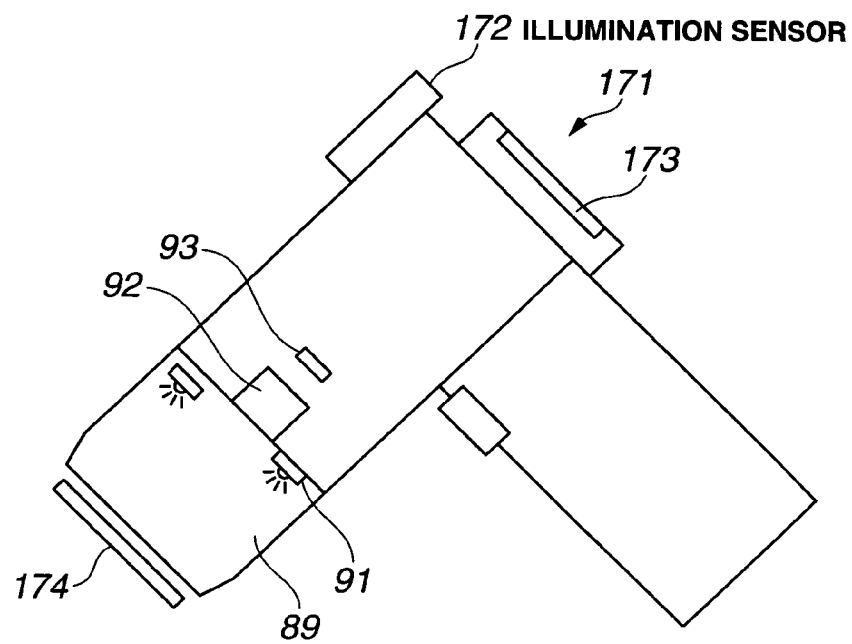
FIG. 20 illustrates a multi-spectral camera that displays a color specified by a color chart ID.
Figure 21:
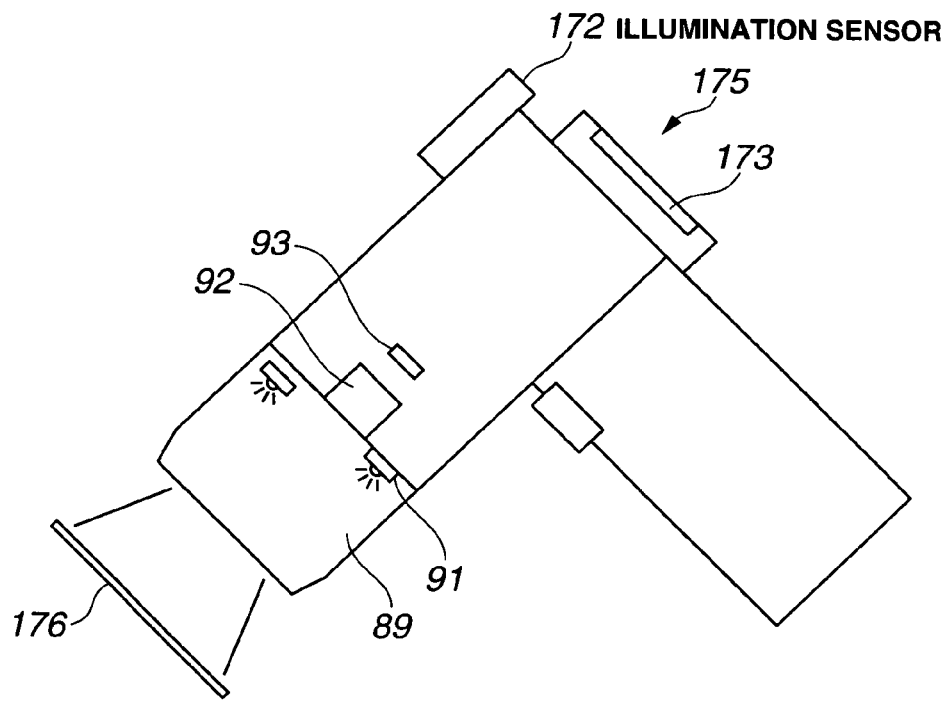
FIG. 21 illustrates another multi-spectral camera that displays a color specified by a color chart ID.

Furthermore, the multi-spectral camera of FIG. 10 or FIG. 13 may be used as a color chart display for displaying the color specified by the color chart ID. FIGS. 20 and 21 illustrate such a case. Referring to FIGS. 20 and 21, elements identical to those of FIG. 10 are designated with the same reference numerals and the description thereof is omitted herein.

A multi-spectral camera 171 of FIG. 20 includes a lens system 92 for focusing light from the subject 1, a CCD 93 for converting an optical image of the subject into an electrical signal, and a multi-color LED illumination device 91 for illuminating the subject. The multi-spectral camera 171 also includes an illumination sensor 172 for measuring an external light spectrum, and a viewfinder 173 as a display to be used to recognize a designation of the color chart ID. The multi-spectral camera 171 has on the front end thereof a blocking member 89 for preventing external light from entering the subject.

In accordance with the present embodiment, a screen 174 is arranged on the opening at the front end of the blocking member 89. The screen 174 may have the same structure as the display 152 of FIG. 18. For example, the screen 174 is mounted on the front end of the blocking member 89 with which the subject intended to be measured is to be in contact.

In accordance with such an arrangement, the primary color signal is supplied to the multi-colored LED illumination device 91. The primary color light rays of the multi-colored LED illumination device 91 are synthesized on the screen 174. In the same manner as the color chart display 146 of FIG. 17, the screen 174 displays the same color as the one that is seen when the color specified by the color chart ID is seen under the determination illumination light.

FIG. 21 illustrates another example of multi-spectral camera displaying a color specified by the color chart ID. Referring to FIG. 21, elements identical to those described with reference to FIG. 20 are designated with the same reference numerals and the description thereof is omitted herein. As shown in FIG. 21, a multi-spectral camera 175 includes the blocking member 89 that places a screen 176 at a location spaced apart from the front end of the camera by a predetermined distance. The primary color light rays from the multi-colored LED illumination device 91 are projected onto the screen 176. Standard white paper and the like, may be used for the screen 176.

Referring to FIG. 20, the primary color light rays of the multi-colored LED illumination device 91 are projected from behind the screen 174, and are synthesized on the screen 174, and a color displayed on the front surface of the screen 174 is observed. In contrast, referring to FIG. 21, the primary color light rays of the multi-colored LED illumination device 91 are directed from the front of the screen 176 and synthesized on the screen 176. A color displayed on the front surface of the screen 176 is observed. As shown in FIG. 21, the primary color light rays are projected onto the screen 176 from the multi-colored LED illumination device 91. The primary color light rays may be projected onto the surface of a painted board or a printing sheet of paper to display the color of the specified color chart ID.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A color chart processing apparatus comprising:
determination illumination light specifying means for selecting a given determination illumination light, wherein a spectrum thereof is information regarding illumination light used to determine a predetermined color chart;
spectrum calculating means for receiving information regarding a spectral reflection factor of each color contained in the predetermined color chart, and the information regarding the selected determination illumination light, and based on both of the received information regarding the spectral reflection factor of each color contained in the predetermined color chart, and the received information regarding the selected determination illumination light, determining a spectrum of each color contained in the predetermined color chart under the selected determination illumination light; and
determination information output means for receiving a color signal of a subject, determining which color of the predetermined color chart most closely matches the color signal of the subject by comparing the spectrum of each color determined by the spectrum calculating means with the color signal of the subject, and outputting information identifying the determined color.

2. The color chart processing apparatus according to claim 1, further comprising color chart spectrum database means for storing information regarding the spectral reflection factor of each color contained in the predetermined color chart.

3. The color chart processing apparatus according to claim 2, wherein the color chart spectrum database means stores spectral reflection factors of a plurality of different color charts, and outputs to the spectrum calculating means information regarding a spectral reflection factor of each color of a given color chart selected in response to a user operation.

4. The color chart processing apparatus according to claim 2, wherein the determination information output means determines a spectral reflection factor of the subject from the color signal of the subject and photographing illumination information obtained when the color signal of the subject is acquired, reproduces the color signal of the subject using the determined spectral reflection factor and newly set subject rendering illumination information, and compares the reproduced color signal of the subject with the spectrum of each color determined by the spectrum calculating means to determine which color of the predetermined color chart most closely matches the reproduced color signal of the subject.

5. The color chart processing apparatus according to claim 2, further comprising color chart converting means for receiving information from the determination information output means, determining which color of another color chart most closely matches the determined color using information regarding the spectral reflection factor of each color contained in the predetermined color chart, and outputting information identifying the determined color of said another color chart.

6. The color chart processing apparatus according to claim 1, further comprising color detecting means for detecting the color signal of the subject.

7. The color chart processing apparatus according to claim 6, wherein the color detecting means comprises a spectrometer.

8. The color chart processing apparatus according to claim 6, wherein the color detecting means comprises a camera for capturing a plurality of spectral images.

9. The color chart processing apparatus according to claim 8, wherein the camera captures the plurality of spectral images under an illumination light.

10. The color chart processing apparatus according to claim 9, wherein the camera comprises a plurality of light emitting diodes having different spectrums, which provide the illumination light of the camera.

11. The color chart processing apparatus according to claim 6, wherein the determination information output means determines a spectral reflection factor of the subject from the color signal of the subject and photographing illumination information obtained when the color signal of the subject is acquired, reproduces the color signal of the subject using the determined spectral reflection factor and newly set subject rendering illumination information, and compares the reproduced color signal of the subject with the spectrum of each color determined by the spectrum calculating means to determine which color of the predetermined color chart most closely matches the reproduced color signal of the subject.

12. The color chart processing apparatus according to claim 6, further comprising color chart converting means for receiving information from the determination information output means, determining which color of another color chart most closely matches the determined color using information regarding the spectral reflection factor of each color contained in the predetermined color chart, and outputting information identifying the determined color of said another color chart.

13. The color chart processing apparatus according to claim 1, further comprising:
   color chart spectrum database means for storing information regarding the spectral reflection factor of each color contained in the predetermined color chart, and
   color detecting means for detecting the color signal of the subject.

14. The color chart processing apparatus according to claim 13, wherein the color chart spectrum database means stores spectral reflection factors of a plurality of different color charts, and outputs to the spectrum calculating means information regarding a spectral reflection factor of each color of a given color chart selected in response to a user operation.

15. The color chart processing apparatus according to claim 13, wherein the color detecting means comprises a spectrometer.

16. The color chart processing apparatus according to claim 13, wherein the color detecting means comprises a camera for capturing a plurality of spectral images.

17. The color chart processing apparatus according to claim 13, wherein the determination information output means determines a spectral reflection factor of the subject from the color signal of the subject and photographing illumination information obtained when the color signal of the subject is acquired, reproduces the color signal of the subject using the determined spectral reflection factor and newly set subject rendering illumination information, and compares the reproduced color signal of the subject with the spectrum of each color determined by the spectrum calculating means to determine which color of the predetermined color chart most closely matches the reproduced color signal of the subject.

18. The color chart processing apparatus according to claim 13, further comprising color chart converting means for receiving information from the determination information output means, determining which color of another color chart most closely matches the determined color using information regarding the spectral reflection factor of each color contained in the predetermined color chart, and outputting information identifying the determined color of said another color chart.

19. The color chart processing apparatus according to claim 1, wherein the determination illumination light specifying means comprises at least one of an illumination sensor for detecting external illumination light and illumination light information storage means for storing spectral information on illumination light.

20. The color chart processing apparatus according to claim 19, wherein the determination illumination light specifying means selects one of an output from the illumination sensor and the information read from the illumination light information storage means, and supplies the selected one of the output from the illumination sensor and the information read from the illumination light information storage means to the spectrum calculating means.

21. The color chart processing apparatus according to claim 1, wherein the determination information output means determines a spectral reflection factor of the subject from the color signal of the subject and photographing illumination information obtained when the color signal of the subject is acquired, reproduces the color signal of the subject using the determined spectral reflection factor and newly set subject rendering illumination information, and compares the reproduced color signal of the subject with the spectrum of each color determined by the spectrum calculating means to determine which color of the predetermined color chart most closely matches the reproduced color signal of the subject.

22. The color chart processing apparatus according to claim 1, wherein the determination information output means determines as the determined color a color with the spectrum most closely matching a spectrum of the color signal of the subject, from among the spectra of the colors determined by the spectrum calculating means.

23. The color chart processing apparatus according to claim 1, further comprising display means for performing a display operation based on the information identifying the determined color output from the determination information output means.

24. The color chart processing apparatus according to claim 1, wherein the determination information output means uses a color chart ID as the information identifying the determined color.

25. The color chart processing apparatus according to claim 1, wherein the determination information output means uses an image representing a distribution of color on the subject as the information identifying the determined color.

26. The color chart processing apparatus according to claim 25, wherein the determination information output means acquires the image representing the distribution of color on the subject from only a predetermined color measurement area of the subject.

27. The color chart processing apparatus according to claim 1, further comprising color chart converting means for receiving information from the determination information output means, determining which color of another color chart most closely matches the determined color using information regarding the spectral reflection factor of each color contained in the predetermined color chart, and outputting information identifying the determined color of said another color chart.

28. A color chart processing method for obtaining information for identifying a color by a color chart processing apparatus, the method comprising:
   selecting a given determination illumination light, wherein a spectrum thereof is information regarding illumination light used to determine a predetermined color chart;
   receiving information regarding a spectral reflection factor of each color contained in the predetermined color chart and information regarding the selected determination illumination light, and based on both the received information regarding the spectral reflection factor of each color contained in the predetermined color chart and the received information regarding the selected determination illumination light, determining a spectrum of each color contained in the predetermined color chart under the selected determination illumination light;
   determining which color of the predetermined color chart most closely matches an input color signal of a subject by comparing the determined spectrum of each color with the input color signal of the subject; and
   outputting information identifying the determined color.

29. The color chart processing method according to claim 28, further comprising determining a spectral reflection factor of the subject from the input color signal of the subject and from photographing illumination information obtained when the color signal of the subject is acquired, and reproducing the color signal of the subject using the determined spectral reflection factor and newly set subject rendering illumination information, wherein the reproduced color signal of the subject is compared with the determined spectrum of each color to determine which color of the predetermined color chart most closely matches the reproduced color signal.

30. A computer-readable recording medium having stored thereon a color chart processing program that is executable by a computer to control the computer to perform functions comprising:
selecting a given determination illumination light, wherein a spectrum thereof is information regarding illumination light used to determine a predetermined color chart;
receiving information regarding a spectral reflection factor of each color contained in the predetermined color chart and information regarding the selected determination illumination light, and based on both the received information regarding the spectral reflection factor of each color contained in the predetermined color chart, and the received information regarding the selected determination illumination light, determining a spectrum of each color contained in the predetermined color chart under the selected determination illumination light;
determining which color of the predetermined color chart most closely matches an input color signal of a subject by comparing the determined spectrum of each color with the input color signal of the subject; and
outputting information identifying the determined color.

31. A computer-readable recording medium having stored thereon a color chart processing program that is executable by a computer to control the computer to perform functions comprising:
selecting a given determination illumination light, wherein a spectrum thereof is information regarding illumination light used to determine a predetermined color chart;
determining a spectral reflection factor of a subject from a color signal of the subject and photographing illumination information obtained when the color signal of the subject is acquired, and reproducing the color signal of the subject using the determined spectral reflection factor and newly set subject rendering illumination information;
receiving information regarding a spectral reflection factor of each color contained in the predetermined color chart and information regarding the selected determination illumination light, and based on both of the received information regarding the spectral reflection factor of each color contained in the predetermined color chart and the received information regarding the selected determination illumination light, determining a spectrum of each color contained in the predetermined color chart under the selected determination illumination light;
determining which color of the predetermined color chart most closely matches the reproduced color signal of the subject by comparing the reproduced color signal of the subject with the determined spectrum of each color; and
outputting information identifying the determined color.

32. A color chart processing apparatus comprising:
a color chart spectrum database which stores a plurality of pieces of spectral reflection factor spectral information on a color chart;
a color chart determination section that receives a color signal of a subject on which a photographing illumination light has been emitted, and that determines which color of the color chart matches a color of the subject; and
determination information display means for displaying information on a determination result of the color chart determination section,
wherein the color chart determination section includes:
determination illumination light specifying means for selecting a given determination illumination light,
a calculating unit which: (i) calculates a plurality of pieces of color chart spectral information under the given determination illumination light, wherein a spectrum thereof is information regarding illumination light used to determine a color chart, using the plurality of pieces of spectral reflection factor spectral information on the color chart read from the color chart spectrum database and spectral information on the determination illumination light, (ii) determines which one of the plurality of pieces of color chart spectral information under the determination illumination light most closely matches subject spectral information obtained from the color signal of the subject, and (iii) outputs a color chart ID that identifies the determined piece of color chart spectral information.

33. The color chart processing apparatus according to claim 32, wherein the subject spectral information is spectral information on reflection light of the subject including spectral information on the photographing illumination light.

34. The color chart processing apparatus according to claim 32, wherein the calculating unit calculates the subject spectral information under subject rendering illumination light that is assumed to be illumination light of the subject, based on the color signal of the subject, spectral information on the photographing illumination light, and spectral information on the subject rendering illumination light.

35. The color chart processing apparatus according to claim 34, wherein the color chart determination section includes an illumination spectral data storing unit which stores spectral information on a predetermined illumination light, and wherein the spectral information on the subject rendering illumination light is spectral information on the predetermined illumination light.

36. The color chart processing apparatus according to claim 35, wherein a data center exchanges data via a communication I/F, and wherein the data center includes the calculating unit and the illumination spectral data storing unit.

37. The color chart processing apparatus according to claim 36, wherein the data center further includes the color chart spectrum database.

38. The color chart processing apparatus according to claim 35, further comprising a first illumination sensor which detects a spectrum of the photographing illumination light,
wherein the color chart determination section includes a second illumination sensor which detects a spectrum of an external light, and
wherein the determination illumination light specifying means selects one of the photographing illumination light, the external light, and the predetermined illumination light, as the subject rendering illumination light.

39. The color chart processing apparatus according to claim 34, further comprising a first illumination sensor which detects a spectrum of the photographing illumination light, wherein the spectral information on the subject rendering illumination light is the spectral information on the photographing illumination light.

40. The color chart processing apparatus according to claim 34, wherein the color chart determination section includes a second illumination sensor which detects a spectrum of an external light, and wherein the spectral information on the subject rendering illumination light is spectral information on the external light.

41. The color chart processing apparatus according to claim 32, wherein a data center exchanges data via a transmitting/receiving unit, and wherein the data center includes the color chart spectrum database.

42. The color chart processing apparatus according to claim 32, further comprising a color detecting unit which detects the color signal of the subject.

43. The color chart processing apparatus according to claim 42, wherein the color detecting unit comprises a multispectral camera which captures a plurality of spectral images.

44. The color chart processing apparatus according to claim 43, wherein the determination information display means outputs the color chart ID for one of each pixel and each predetermined area of a subject image.

45. The color chart processing apparatus according to claim 32, further comprising:
a mixing ratio database which stores, for each of plural color chart IDs, information regarding a mixing ratio of a plurality of materials for obtaining a color to be produced; and
a mixing ratio acquisition unit which outputs a mixing amount of each of the materials based on the mixing ratio read from the mixing ratio database for the color chart ID outputted from the color chart determination section.

46. The color chart processing apparatus according to claim 32, wherein the color chart spectrum database includes plural color chart spectral data storing units for plural types of color charts,
wherein the color chart spectral data storing units store spectral information on the plurality of color charts, and
wherein the color chart determination section includes color chart database specifying means for specifying a type of color chart from among the plurality of color charts to be used for determination from the color chart spectrum database.

47. A color chart processing method for obtaining information for identifying a color by a color chart processing apparatus which comprises a color chart spectrum database that stores a plurality of pieces of spectral reflection factor spectral information on a color chart, the method comprising:
receiving a color signal of a subject on which photographing illumination light has been emitted, and determining which color of the color chart stored in the color chart spectrum database matches a color of the subject;
selecting a given determination illumination light;
calculating a plurality of pieces of color chart spectral information under the selected determination illumination light, wherein a spectrum thereof is information regarding illumination light used to determine a color chart, using the plurality of pieces of spectral reflection factor spectral information on the color chart read from the color chart spectrum database and spectral information on the determination illumination light;
determining which one of the plurality of pieces of color chart spectral information under the determination illumination light most closely matches subject spectral information obtained from the color signal of the subject;
outputting a color chart ID that identifies the determined piece of color chart spectral information; and
displaying, on a display unit, information on the determined color.

48. The color chart processing method according to claim 47, further comprising calculating spectral information on the subject based on the color signal of the subject, spectral information on the photographing illumination light, and spectral information on subject rendering illumination light which is assumed to be illumination light of the subject.

49. A computer-readable recording medium having stored thereon a color chart processing program that is executable by a computer of a color chart processing apparatus which comprises a color chart spectrum database that stores a plurality of pieces of spectral reflection factor spectral information on a color chart, wherein the program controls the computer to preform functions comprising:
receiving a color signal of a subject on which photographing illumination light has been emitted, and determining which color of the color chart stored in the color chart spectrum database matches a color of the subject;
selecting a given determination illumination light;
calculating a plurality of pieces of color chart spectral information under the selected determination illumination light, wherein a spectrum thereof is information regarding illumination light used to determine a color chart, using the plurality of pieces of spectral reflection factor spectral information on the color chart read from the color chart spectrum database and spectral information on the determination illumination light;
determining which one of the plurality of pieces of color chart spectral information under the determination illumination light most closely matches subject spectral information obtained from the color signal of the subject;
outputting a color chart ID that identifies the determined piece of color chart spectral information; and
displaying information on the determined color.

50. The computer-readable recording medium having stored thereon the color chart processing program according to claim 49, wherein the program further controls the computer to calculate spectral information on the subject based on the color signal of the subject, spectral information on the photographing illumination light, and spectral information on subject rendering illumination light which is assumed to be illumination light of the subject.

51. A color chart processing apparatus comprising:
a first color chart spectrum database which stores a plurality of pieces of spectral reflection factor spectral information on a color chart;
a first color chart determination section which: (i) calculates subject spectral information under a given determination illumination light, wherein a spectrum thereof is information regarding illumination light used to determine one color chart, using a color chart ID of said one color chart determined to be a color of a subject and spectral information on the determination illumination light, (ii) calculates a plurality of pieces of color chart spectral information under a given conversion color chart illumination light, wherein a spectrum thereof is information regarding illumination light used to determine another color chart different from said one color chart, using the plurality of pieces of spectral reflection factor spectral information on the color chart stored by the first color chart spectrum database, and spectral information on the conversion color chart illumination light, (iii) determines which one of the plurality of pieces of color chart spectral information under the conversion color chart illumination light most closely matches the calculated subject spectral information, and (iv) outputs a color chart ID of said another color chart which identifies said determined piece of color chart spectral information; and determination information display means for displaying the output color chart ID of said another color chart.

52. The color chart processing apparatus according to claim 51, wherein the first color chart determination section includes conversion color chart illumination light specifying means for selecting the given conversion color chart illumination light.

53. The color chart processing apparatus according to claim 51, further comprising:

a second color chart spectrum database which stores a plurality of pieces of spectral reflection factor spectral information on a color chart different from the color chart stored in the first color chart spectrum database; and a second color chart determination section which: (i) receives a color signal of the subject to which photographing illumination light has been emitted, (ii) calculates a plurality of pieces of color chart spectral information under the determination illumination light, using the plurality of pieces of spectral reflection factor spectral information on the color chart read from the second color chart spectrum database, and the spectral information on the determination illumination light, (iii) determines which one of the plurality of pieces of color chart spectral information under the determination illumination light most closely matches the subject spectral information obtained from the color signal of the subject, and (iv) outputs the color chart ID of said one color chart which identifies the determined piece of color chart spectral information.

54. The color chart processing apparatus according to claim 53, wherein the second color chart determination section calculates the subject spectral information under subject rendering illumination light which is assumed to be illumination light of the subject, based on the color signal of the subject, spectral information on the photographing illumination light, and spectral information on the subject rendering illumination light.

55. The color chart processing apparatus according to claim 54, wherein the second color chart determination section includes an illumination spectral data storing unit which stores spectral information on predetermined illumination light, and the spectral information on the subject rendering illumination light is the spectral information on the predetermined illumination light.

56. The color chart processing apparatus according to claim 55, wherein the second color chart determination section comprises:

an illumination sensor which detects a spectrum of an external light; and determination illumination light specifying means for selecting one of the photographing illumination light, the external light, and the predetermined illumination light, as the subject rendering illumination light.

57. The color chart processing apparatus according to claim 56, wherein the determination illumination light specifying means is also for selecting the given determination illumination light.

58. The color chart processing apparatus according to claim 54, wherein the second color chart determination section includes an illumination sensor which detects a spectrum of an external light, and wherein the spectral information on the subject rendering illumination light is spectral information on the external light.

59. The color chart processing apparatus according to claim 58, wherein the illumination sensor detects a spectrum of the photographing illumination light, and wherein the spectral information on the subject rendering illumination light is spectral information on the photographing illumination light.

60. The color chart processing apparatus according to claim 53, wherein the second color chart determination section includes determination illumination light specifying means for selecting the given determination illumination light.

61. The color chart processing apparatus according to claim 51, further comprising a color detecting unit for detecting a color signal of the subject.

62. The color chart processing apparatus according to claim 61, wherein the color detecting unit comprises a multispectral camera which captures a plurality of spectral images.

63. A color chart processing method for obtaining information for identifying a color by a color chart processing apparatus which comprises a first color chart spectrum database that stores a plurality of pieces of spectral reflection factor spectral information on a color chart, the method comprising:

calculating subject spectral information under a given determination illumination light, wherein a spectrum thereof is information regarding illumination light used to determine one color chart, using a color chart ID of said one color chart determined to be a color of a subject and spectral information on the determination illumination light;

calculating a plurality of pieces of color chart spectral information under a given conversion color chart illumination light, wherein a spectrum thereof is information regarding illumination light used to determine another color chart different from said one color chart, using the plurality of pieces of spectral reflection factor spectral information regarding the color chart stored in the first color chart spectrum database, and spectral information regarding the conversion color chart illumination light;

determining which one of the plurality of pieces of color chart spectral information under the conversion color chart illumination light most closely matches the calculated subject spectral information; and displaying, on a display unit, a color chart ID of said another color chart that identifies the determined piece of color chart spectral information.

64. The color chart processing method according to claim 63, wherein the color chart processing apparatus further comprises a second color chart spectrum database which stores a plurality of pieces of spectral reflection factor spectral information on a color chart different from the color chart stored in the first color chart spectrum database, the method further comprising:

receiving a color signal of the subject on which photographing illumination light has been emitted;

calculating a plurality of pieces of color chart spectral information under the determination illumination light using the plurality of pieces of spectral reflection factor spectral information on the color chart stored in the second color chart spectrum database, and the spectral information on the determination illumination light;

determining which one of the plurality of pieces of color chart spectral information under the determination illumination light most closely matches the subject spectral information obtained from the color signal of the subject; and outputting the color chart ID of said one color chart that identifies the determined piece of color chart spectral information.

65. A computer-readable recording medium having stored thereon a color chart processing program that is executable by a computer of a color chart processing apparatus which comprises a first color chart spectrum database that stores a plurality of pieces of spectral reflection factor spectral information on a color chart, wherein the program controls the computer to perform functions comprising:

calculating subject spectral information under a given determination illumination light, wherein a spectrum thereof is information regarding illumination light used to determine one color chart, using a color chart ID of said one color chart determined to be a color of a subject and spectral information on the determination illumination light;

calculating a plurality of pieces of color chart spectral information under a given conversion color chart illumination light, wherein a spectrum thereof is information regarding illumination light used to determine another color chart different from said one color chart, using the plurality of pieces of spectral reflection factor spectral information regarding the color chart stored in the first color chart spectrum database and spectral information regarding the conversion color chart illumination light; and determining which one of the plurality of pieces of color chart spectral information under the conversion color chart illumination light most closely matches the calculated subject spectral information; and displaying a color chart ID of said another color chart that identifies the determined piece of color chart spectral information.

66. The computer-readable recording medium having stored thereon the color chart processing program according to claim 65, wherein the color chart processing apparatus further comprises a second color chart spectrum database which stores a plurality of pieces of spectral reflection factor spectral information on a color chart different from the color chart stored in the first color chart spectrum database, and wherein the program further controls the computer to perform functions comprising:

receiving a color signal of the subject on which photographing illumination light has been emitted;

calculating a plurality of pieces of color chart spectral information under the determination illumination light using the plurality of pieces of spectral reflection factor spectral information on the color chart stored in the second color chart spectrum database, and the spectral information on the determination illumination light;

determining which one of the plurality of pieces of color chart spectral information under the determination illumination light most closely matches the subject spectral information obtained from the color signal of the subject; and outputting the color chart ID of said one color chart that identifies the determined piece of color chart spectral information.

* * * * *